United States Patent
Nirula et al.

(10) Patent No.: US 12,235,349 B2
(45) Date of Patent: *Feb. 25, 2025

(54) POSITION ACCURACY USING SENSOR DATA

(71) Applicant: QUALCOMM Incorporated, San Diego, CA (US)

(72) Inventors: Gautam Nirula, Pleasanton, CA (US); William Morrison, San Francisco, CA (US)

(73) Assignee: QUALCOMM Incorporated, San Diego, CA (US)

( * ) Notice: Subject to any disclaimer, the term of this patent is extended or adjusted under 35 U.S.C. 154(b) by 28 days.

This patent is subject to a terminal disclaimer.

(21) Appl. No.: 18/326,149

(22) Filed: May 31, 2023

(65) Prior Publication Data

US 2023/0305139 A1 Sep. 28, 2023

Related U.S. Application Data

(63) Continuation of application No. 17/198,560, filed on Mar. 11, 2021, now Pat. No. 11,703,586.

(51) Int. Cl.
*H04L 1/00* (2006.01)
*G01S 13/86* (2006.01)
(Continued)

(52) U.S. Cl.
CPC .......... *G01S 13/867* (2013.01); *G01S 13/865* (2013.01); *G01S 13/89* (2013.01); *G01S 19/071* (2019.08); *G01S 19/10* (2013.01)

(58) Field of Classification Search
CPC .... H04W 4/02; H04W 4/043; G06Q 30/0623; G01D 5/12; G01S 5/0263; G01S 13/867; G01S 13/865; G01S 13/89; G01S 19/071; G01S 19/10; G08G 1/162; G01C 21/3635; G01C 21/3694; G01T 19/006
See application file for complete search history.

(56) References Cited

U.S. PATENT DOCUMENTS 11,585,933 B2  2/2023  Panas
2013/0157682 A1  6/2013  Ling
(Continued)

OTHER PUBLICATIONS

International Search Report and Written Opinion—PCT/US2022/012674—ISA/EPO—Aug. 17, 2022.
(Continued)

*Primary Examiner* — Phuoc H Doan
(74) *Attorney, Agent, or Firm* — QUALCOMM Incorporated

(57) ABSTRACT

Techniques are provided for determining a location of a mobile device based on visual positioning solution (VPS). An example method for determining a position estimate of a mobile device includes obtaining sensor information, detecting one or more identifiable features in the sensor information, determining a range to at least one of the one or more identifiable features, obtaining coarse map information, determining a location of the at least one of the one or more identifiable features based on the coarse map information, and determining the position estimate for the mobile device based at least in part on the range to the at least one of the one or more identifiable features.

30 Claims, 13 Drawing Sheets

(51) Int. Cl.
  G01S 13/89  (2006.01)
  G01S 19/07  (2010.01)
  G01S 19/10  (2010.01)

(56) References Cited

U.S. PATENT DOCUMENTS

| | | |
|---|---|---|
| 2013/0230208 A1 | 9/2013 | Gupta et al. |
| 2016/0061612 A1 | 3/2016 | You et al. |
| 2016/0077189 A1* | 3/2016 | Elias .................. H04W 4/33 |
| | | 455/456.6 |
| 2019/0316929 A1* | 10/2019 | Shin .................. G05D 1/0246 |
| 2019/0347820 A1 | 11/2019 | Golinsky et al. |
| 2020/0124421 A1 | 4/2020 | Kang et al. |
| 2022/0291373 A1 | 9/2022 | Nirula et al. |

OTHER PUBLICATIONS

Partial International Search Report—PCT/US2022/012674—ISA/EPO—May 9, 2022.
Schule F., et al., "Feature Evaluation of Factorized Self-Localization", 17th International IEEE Conference on Intelligent Transportation Systems (ITSC), IEEE, Oct. 8, 2014, pp. 451-457, XP032685541, DOI: 10.1109/ITSC.2014.6957731 abstract sections I-IV figures 1-13.

* cited by examiner

POSITION ACCURACY USING SENSOR DATA

CROSS-REFERENCE TO RELATED APPLICATION

This application is a continuation of U.S. patent application Ser. No. 17/198,560, filed Mar. 11, 2021, entitled "POSITION ACCURACY USING SENSOR DATA," which is assigned to the assignee hereof, and the entire contents of which are hereby incorporated herein by reference for all purposes.

BACKGROUND

The Global Positioning System (GPS) is an example of a GNSS navigation system in which a receiver determines its position by precisely measuring the arrival time of signaling events received from multiple satellites. Each satellite transmits a navigation message containing the precise time when the message was transmitted and ephemeris information. Each sub-frame of the navigation message starts with a telemetry word (TLM) and the number of the sub-frame. The start of the sub-frame may be detected by means of a preamble sequence in the TLM. Each sub-frame also includes a handover word (HOW), which gives the exact time of the week (TOW) when the satellite will transmit the next sub-frame according to the local version of GPS time held by the satellite's clock. The ephemeris information includes details about the satellite's orbit and corrections for the satellite's own clock, in comparison with GPS time. The ephemeris and clock correction parameters may collectively be known as ephemeris information.

GNSS accuracy may degrade significantly under weak signal conditions such as when the line-of-sight (LOS) to the satellite vehicles is obstructed by natural or manmade objects. In natural or urban canyons, for example, limitations on visible satellites and other multipath effects may induce an absolute position error of the order of tens of meters (e.g. as much as 50 meters) and relative position error on the order of several meters. In addition, accuracy may be further degraded by the limited availability of acceptable GNSS measurements. For example, GNSS measurements in urban areas (e.g., urban canyons) may be degraded due to multipath effects on signals transmitted from satellite vehicles (SVs).

SUMMARY

An example method for determining a position estimate of a mobile device according to the disclosure includes obtaining sensor information, detecting one or more identifiable features in the sensor information, determining a range to at least one of the one or more identifiable features, obtaining coarse map information, determining a location of the at least one of the one or more identifiable features based on the coarse map information, and determining the position estimate for the mobile device based at least in part on the range to the at least one of the one or more identifiable features.

Implementations of such a method may include one or more of the following features. Determining the range to the at least one of the one or more identifiable features may be based on an output of a remote sensor. The remote sensor is a lidar device or a radar device. The at least one of the one or more identifiable features may include at least one of a crosswalk, an intersection, a traffic light, and a road sign. Obtaining the coarse map information may include providing a coarse position to a remote server and receiving the coarse map information from the remote server. The coarse position may be based on a location computed by a satellite position system. The coarse position of the mobile device may be based on a terrestrial navigation technique. The sensor information may be an image and detecting the one or more identifiable features in the sensor information may include performing an optical character recognition process on the image. Detecting the one or more identifiable features in the sensor information may include determining a street name or a business name.

An example method for determining a position estimate of a mobile device according to the disclosure includes obtaining coarse map information, obtaining sensor information, performing an optical character recognition process on the sensor information, determining one or more identifiable features based on the optical character recognition process and the coarse map information, and determining the position estimate for the mobile device based at least in part on the coarse map information and the one or more identifiable features.

Implementations of such a method may include one or more of the following features. The method may further include determining a distance to the one or more identifiable features, and determining the position estimate for the mobile device based at least in part on the distance to the one or more identifiable features. Determining the distance to the one or more identifiable features may be based on an output of a range sensor. The range sensor may be a lidar device or a radar device. Determining the one or more identifiable features may include determining a street name and an intersection location. Determining the one or more identifiable features may include determining a business name and an address associated with the business name. Obtaining the coarse map information may include providing a coarse position to a remote server and receiving the coarse map information from the remote server. The coarse position of the mobile device may be based on a location obtained using a global navigation satellite system. The coarse position of the mobile device may be based on a location obtained using a terrestrial navigation technique.

An example method for determining a position estimate of a mobile device according to the disclosure includes determining a coarse position of the mobile device, obtaining coarse map information based on the coarse position, obtaining sensor information, determining one or more road curvature features based on the sensor information, determining that a comparison value meets a threshold, wherein the comparison value is based on a comparison between a road curvature feature in the coarse map information and the one or more road curvature features detected in the sensor information, determining a heading for the mobile device based at least in part on the road curvature feature in the coarse map information, and determining the position estimate for the mobile device based at least in part on the heading.

Implementations of such a method may include one or more of the following features. The sensor information may be an image. The sensor information may be a point cloud obtained with one or more radar or lidar sensors. The sensor information may be obtained with one or more remote sensors. The one or more road curvature features may include one or more lane markers. The one or more road curvature features may include one or more guardrails. Determining that the comparison value meets a threshold value may include performing a convolution between the road curvature feature detected in the sensor information and a road in the coarse map information. The coarse position of the mobile device may be based on a location obtained using a global navigation satellite system. The coarse position of the mobile device may be based on a location obtained using a terrestrial navigation technique. The coarse map information may include providing the coarse position to a remote server and receiving the coarse map information from the remote server. Determining the position estimate may include providing heading and global navigation satellite signal information to a recursive algorithm. The recursive algorithm may be a Kalman filter.

An example apparatus according to the disclosure includes a memory, at least one transceiver, at least one processor communicatively coupled to the memory and the at least one transceiver, and configured to obtain sensor information, detect one or more identifiable features in the sensor information, determine a range to at least one of the one or more identifiable features, obtain coarse map information, determine a location of the at least one of the one or more identifiable features based on the coarse map information, and determine a position estimate based at least in part on the range to the at least one of the one or more identifiable features.

An example apparatus according to the disclosure includes a memory, at least one transceiver, at least one processor communicatively coupled to the memory and the at least one transceiver, and configured to obtain coarse map information, obtain sensor information, perform an optical character recognition process on the sensor information, determine one or more identifiable features based on the optical character recognition process and the coarse map information, and determine a position estimate based at least in part on the coarse map information and the one or more identifiable features.

An example apparatus according to the disclosure includes a memory, at least one transceiver, at least one processor communicatively coupled to the memory and the at least one transceiver, and configured to determine a coarse position, obtain coarse map information based on the coarse position, obtain sensor information, determine one or more road curvature features based on the sensor information, determine that a comparison value meets a threshold, wherein the comparison value is based on a comparison between a road curvature feature in the coarse map information and the one or more road curvature features detected in the sensor information, determine a heading based at least in part on the road curvature feature in the coarse map information, and determine a position estimate based at least in part on the heading.

Items and/or techniques described herein may provide one or more of the following capabilities, and/or other capabilities not mentioned. A mobile device may compute a coarse position based on satellite and/or terrestrial positioning techniques. Coarse map information may be obtained based on the coarse position. Visually identifiable features such as street names, intersection locations and business names and addresses may be included in the coarse map information. An image sensor on the mobile device may obtain images of the environment. In an example, the images may be analyzed based on the visually identifiable information in the coarse map information. In an example, the images may be analyzed for road curvature information. The position of the mobile device may be estimated based on a comparison of the visually identifiable information and/or the road curvature information in the images and the coarse map information. The position estimates do not rely on specialized high definition image mapping databases. Other capabilities may be provided and not every implementation according to the disclosure must provide any, let alone all, of the capabilities discussed.

BRIEF DESCRIPTION OF DRAWINGS

Non-limiting and non-exhaustive aspects are described with reference to the following figures, wherein like reference numerals refer to like parts throughout the various figures unless otherwise specified.

DETAILED DESCRIPTION

Techniques are discussed herein for determining a location of a mobile device based on a visual positioning solution (VPS). Positioning solutions in urban environments may be subject to higher errors in positioning due to multipath effects on signals transmitted from SVs and terrestrial stations. There is a need for higher accuracy and higher reliability positioning solutions for a variety of mobile computing applications and use cases. For example, Augmented Reality (AR) devices, VPS devices, and vehicle navigation devices may include one or more image sensors such as one or more cameras disposed on a device or a vehicle and oriented in a direction of motion. In one example, image sensors may be configured to generate a video stream which may be integrated with a navigation system (e.g., Inertial Measurement Unit (IMU), GNSS, etc.) to improve the positioning solutions generated on the devices. Prior camera integrated navigation solutions rely on specialized and pre-built high definition and feature mapping infrastructure. Such solutions are therefore limited to areas where pre-existing mapping images have been generated and are available and/or compatible with a mobile device. The proposed solution identifies visible features in widely available coarse mapping information and may utilize the visible features to improve positioning calculations and the corresponding positioning estimates. Further, the proposed solution may utilize input from different sensors and/or different devices which may be disposed in different locations. These techniques and configurations are examples, and other techniques and configurations may be used.

Figure 1A:
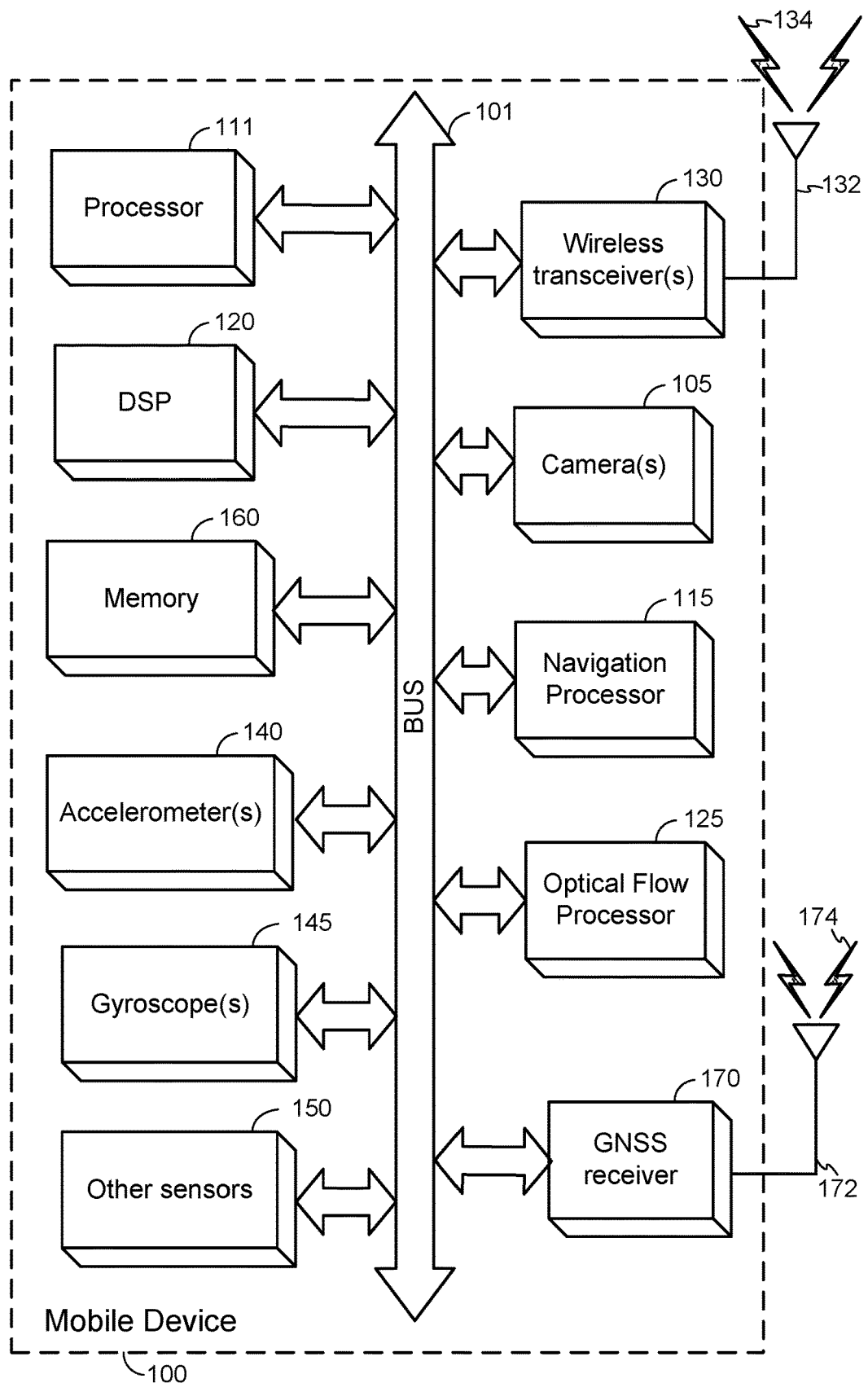
FIG. 1A is a block diagram of a mobile device that can be used to implement the techniques discussed herein.

Referring to FIG. 1A, a block diagram of a mobile device 100 that can be used to implement enhanced RTA and alignment detection techniques is shown. The mobile device 100 can include or implement the functionality of various mobile communication and/or computing devices; examples include, but are not limited to, in-vehicle navigation systems, VPSs, wearable navigation devices, smartphones, wrist watches, helmets, virtual reality (VR) goggles, smart glasses, cameras, etc., whether presently existing or developed in the future. The mobile device 100 includes a processor 111 (or processor core), one or more Digital Signal Processors (DSP) 120, and a memory unit 160. The processor 111 may be a Central Processing Unit (CPU), a multi-core CPU, a Graphics Processing Unit (GPU), a multi-core GPU, a video engine, or any combination thereof. A processor core may be an applications processor. A navigation processor 115 and an optical flow processor 125 are depicted within the mobile device 100 as an example, and not a limitation. The navigation processor 115 and the optical flow processor 125 may be included in the memory unit 160 and utilize the processor 111. The navigation processor 115 and/or the optical flow processor 125 may be a System on Chip (SoC) within the mobile device (e.g., it may be dedicated hardware or may be a discrete chipset or part of a discrete chipset (e.g., on a discrete applications processor)), or may be included in an one or more auxiliary systems (e.g., remote from the mobile device 100). In one embodiment, the mobile device includes one or more cameras 105 (e.g., front and/or back facing) such as, for example, complementary metal-oxide-semiconductor (CMOS) image sensors with appropriate lens configurations. Other imaging technologies such as charge-coupled devices (CCD) and back side illuminated CMOS may be used. The cameras 105 are configured to obtain and provide image information to the optical flow processor 125. In another embodiment, one or more external cameras may be used. In an example, the cameras 105 may be configured with depth sensors, such as infrared depth sensors for determining a range to an object.

The mobile device 100 may also include a wireless transceiver 130 configured to send and receive wireless signals 134 via a wireless antenna 132 over a wireless network. The wireless transceiver 130 is connected to a bus 101. Here, the mobile device 100 is illustrated as having a single wireless transceiver 130. However, a mobile device 100 can alternatively have multiple wireless transceivers 130 and wireless antennas 132 to support multiple communication standards such as Wi-Fi®, CDMA, Wideband CDMA (WCDMA), Long Term Evolution (LTE), Fifth Generation (5G) New Radio (NR), Bluetooth® short-range wireless communication technology, etc.

The wireless transceiver 130 may support operation on multiple carriers (waveform signals of different frequencies). Multi-carrier transmitters can transmit modulated signals simultaneously on the multiple carriers. Each modulated signal may be a Code Division Multiple Access (CDMA) signal, a Time Division Multiple Access (TDMA) signal, an Orthogonal Frequency Division Multiple Access (OFDMA) signal, a Single-Carrier Frequency Division Multiple Access (SC-FDMA) signal, etc. Each modulated signal may be sent on a different carrier and may carry pilot, overhead information, data, etc.

The mobile device 100 also includes a Global Navigation Satellite System (GNSS) receiver 170 that receives satellite positioning system (SPS) signals 174 (e.g., from SPS satellites) via an SPS antenna 172. The GNSS receiver 170 can communicate with a single global navigation satellite system (GNSS) or multiple such systems. A GNSS can include, but are not limited to, Global Positioning System (GPS), Galileo, Glonass, Beidou (Compass), etc. SPS satellites are also referred to as satellites, space vehicles (SVs), etc. The GNSS receiver 170 processes, in whole or in part, the SPS signals 174 and uses these SPS signals 174 to determine the location of the mobile device 100. The processor 111, DSP 120, and memory 16, and/or specialized processor(s) (not shown) may also be utilized to process the SPS signals 174, in whole or in part, and/or to calculate the location of the mobile device 100, in conjunction with GNSS receiver 170. Storage of information from the SPS signals 174 or other location signals is performed using a memory unit 160 or registers (not shown). A navigation processor 115 may comprise instructions configured to compute position information based on GNSS signals, and/or dead reckoning position information based on information receive from microelectromechanical systems (MEMS) such as the accelerometers 140, gyroscope(s) 145, and/or other sensors 150 (e.g., pressure sensor, magnetometer, microphone). In an example, the other sensors 150 may include a depth sensor, and/or lidar for measuring ranges from the mobile device 100. In an example, the other sensors 150 may include an always on motion detection device configured to send an interrupt to the processor 111 when a motion is detected. For example, the ST Microelectronics part number LSM6DSL is an example of an always on 3D accelerometer and 3D gyroscope which may function as the accelerometers 140, gyroscope(s) 145, and/or other sensors 150. While one processor 111, DSP 120, and a memory unit 160 are shown in FIG. 1A, more than one of any, a pair, or all of these components could be used by the mobile device 100.

The memory unit 160 can include a non-transitory machine-readable storage medium (or media) that stores functions as one or more instructions or code. Media that can make up the memory unit 160 include, but are not limited to, RAM, ROM, FLASH, disc drives, etc. In general, the functions stored by the memory unit 160 are executed by the processor 111, DSP 120, or other specialized processors. Thus, the memory unit 160 is a processor-readable memory and/or a computer-readable memory that stores software (programming code, instructions, machine code, etc.) configured to cause the processor 111 to perform the functions described. Alternatively, one or more functions of the mobile device 100 may be performed in whole or in part in hardware. The memory unit 160 may be communicatively coupled to the processor 111 via the bus 101. The term communicatively coupled describes the ability of components within the mobile device 100, or other systems, to exchange and process electronic signals.

A mobile device 100 can estimate its current position within an associated system using various techniques, based on other communication entities within view and/or information available to the mobile device 100. For instance, a mobile device 100 can estimate its position using information obtained from access points associated with one or more wireless local area networks (LANs), personal area networks (PANs) utilizing a short-range wireless communication technology such as Wi-Fi, Bluetooth® or ZigBee®, etc., SPS satellites, and/or map constraint data obtained from a map server or other location server. The mobile device 100 may also estimate its current position based on dead reckoning techniques using inertial sensors such as the accelerometer 140, gyroscope(s) 145 and other sensors 150 (e.g., magnetometer, pressure sensor, solid state compass). In an example, the mobile device 100 may determine a current position based, at least in part, on images obtained by the cameras 105 (e.g., by comparing current images to previously stored images). In general, the inertial sensors are used to measure the displacement of the mobile device 100. For example, the mobile device 100 may enter an INS state such that the navigation processor 115 is configured to receive signals from one or more inertial sensors (e.g., accelerometer, gyroscope, solid state compass) and compute a dead reckoning position. The dead reckoning position may be computed on a periodic basis, based on a context change, and/or when course and speed information changes. In an example, the dead reckoning position may be adjusted when another position is determined (e.g., GNSS, trilateration, user input). For pedestrian applications, the accelerometers 140 may include a 3-axis accelerometer to drive a pedometer and determine a step count or step rate.

In an embodiment, the one or more of the components in the mobile device 100 may be performed by a peripheral device configured to provide data to the mobile device. For example, the GNSS receive 170 may be a peripheral GNSS receiver configured to provide navigation data via the wireless transceiver 130 (e.g. Bluetooth). Other sensors such as radar, lidar, and optical sensors such as the camera 105 may be located remotely from the mobile device 100 and configured to provide information via wired or wireless interfaces. For example, cameras or lidar sensors installed on at different locations on a vehicle and configured to connect with the mobile device 100 via a wireless link. In another example, the mobile device 100 may have a wireless connection with a wearable action camera, AR goggles, smart glasses (with a camera), or other wearable sensor, such that the wearable sensor is configured to provide sensor information to improve position accuracy using the techniques provided herein.

Figure 1B:
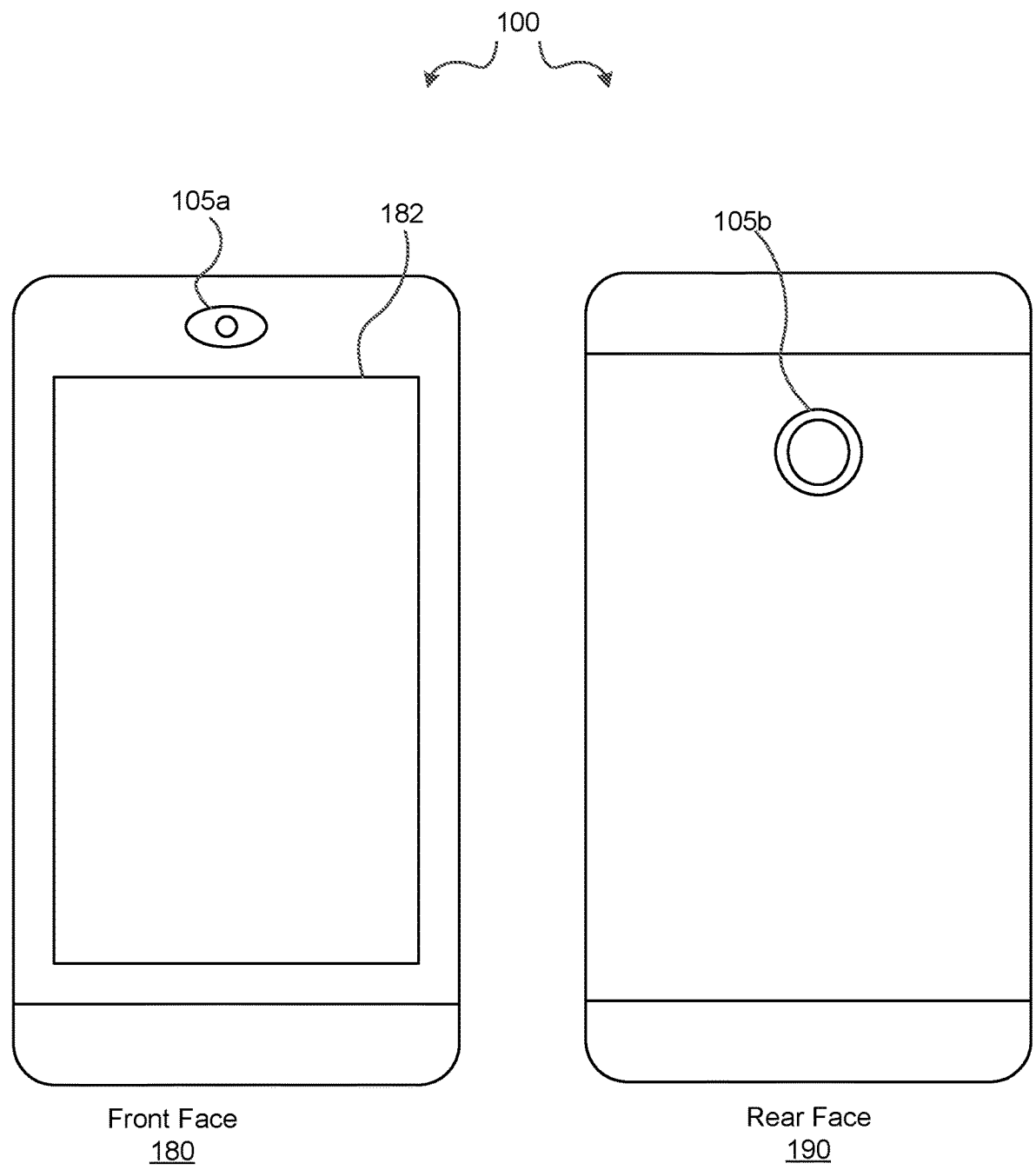
FIG. 1B is a perspective of a mobile device with front and rear facing cameras.

FIG. 1B is an illustration of a mobile device 100 operable to perform functions described herein. FIG. 1B may represent a smart phone using one or more components of the mobile device of FIG. 1A. However, the functionality described herein is not limited to using smart phones and may use any device with capabilities similar to FIG. 1A and suitable for performing such functionality. These devices may include mobile devices, digital cameras, camcorders, tablets, PDAs, smart glasses, VR goggles, or any other similar device. FIG. 1B illustrates a front face 180 and rear face 190 of the mobile device 100. The front face 180 includes a display 182 and a first camera 105a. The first camera 105a is coupled to the front-facing side of the mobile device 100 is also referred to as a front-facing camera. The rear face 190 of the mobile device 100 includes a second camera 105b, also referred to herein as a rear-facing camera. The mobile device 100 may be held or mounted such that the front-facing camera 105a faces the user of the mobile device 100 and the rear-facing camera 105b faces away from the user of the device. Alternatively, the converse may be true depending on how the mobile device 100 is held by the user, or mounted in a holder (e.g., an arm band), or in a cradle. Both the front-facing camera 105a and the rear-facing camera 105b may be an implementation of the camera(s) 105 and configured to provide image information to the optical flow processor 125, as discussed with reference to FIG. 1A. In an example, the first camera 105a and the second camera 105b may include a range detection device, such as an infrared transmitter and receiver configured as a depth sensor to determine a range to an object and enable the cameras 105a-b to electrically and/or mechanically focus on the object.

Figure 2:
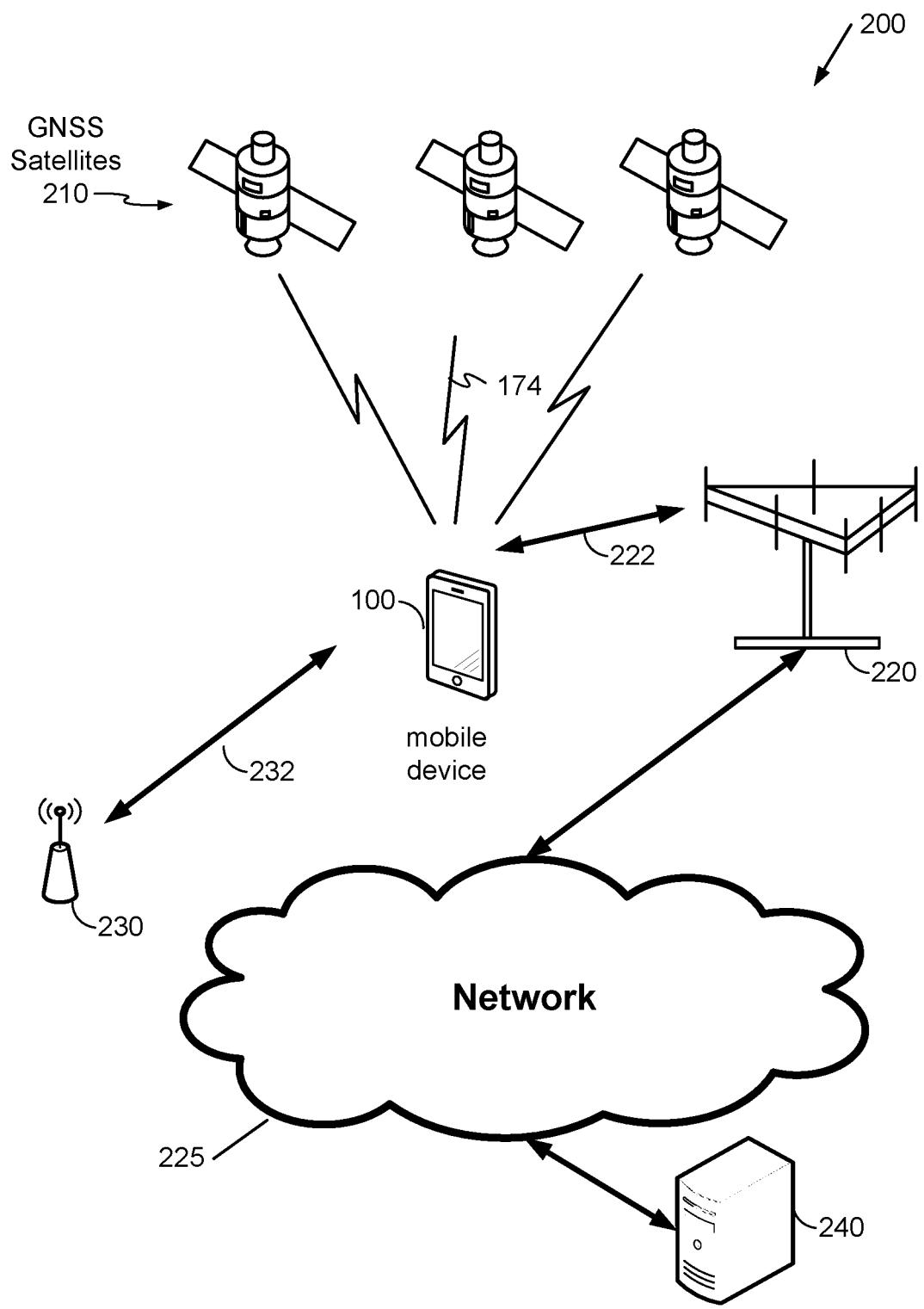
FIG. 2 is a block diagram of an example network architecture configured to communicate with the mobile device of FIGS. 1A and 1B.

Referring to FIG. 2, an example network architecture 200 configured to communicate with the mobile device of FIG. 1A is shown. The mobile device 100 may transmit radio signals to, and receive radio signals from, a wireless communication network. In one example, the mobile device 100 may communicate with a cellular communication network by transmitting wireless signals to, or receiving wireless signals from a cellular transceiver 220 which may comprise a wireless base transceiver subsystem (BTS), a Node B, an evolved NodeB (eNodeB), and/or a next generation NodeB (gNodeB) over the wireless communication link 222. Similarly, the mobile device 100 may transmit wireless signals to, or receive wireless signals from the local transceiver 230 over the wireless communication link 232. A local transceiver 230 may comprise an access point (AP), femtocell, Home Base Station, small cell base station, Home Node B (HNB) or Home eNodeB (HeNB) and may provide access to a wireless local area network (WLAN, e.g., IEEE 802.11 network), a wireless personal area network (WPAN, e.g., Bluetooth® network) or a cellular network (e.g. a 5G NR and/or LTE networks or other wireless wide area networks). Of course it should be understood that these are merely examples of networks that may communicate with a mobile device over a wireless link, and claimed subject matter is not limited in this respect.

Examples of network technologies that may support the wireless communication link 222 are Global System for Mobile Communications (GSM), Code Division Multiple Access (CDMA), Wideband CDMA (WCDMA), Long Term Evolution (LTE), 5G NR, High Rate Packet Data (HRPD). GSM, WCDMA, LTE, and 5G NR are technologies defined by 3GPP. CDMA and HRPD are technologies defined by the 3rd Generation Partnership Project 2 (3GPP2). WCDMA is also part of the Universal Mobile Telecommunications System (UMTS) and may be supported by an HNB. The cellular transceivers 220 may comprise deployments of equipment providing subscriber access to a wireless telecommunication network for a service (e.g., under a service contract). Here, a cellular transceiver 220 may perform functions of a cellular base station in servicing subscriber devices within a cell determined based, at least in part, on a range at which the cellular transceiver 220 is capable of providing access service. Examples of radio technologies that may support the wireless communication link 222 are IEEE 802.11, Bluetooth®, LTE and 5G NR.

In a particular implementation, the cellular transceiver 220 and the local transceiver 230 may communicate with one or more servers 240 over a network 225. Here, the network 225 may comprise any combination of wired and/or wireless links and may include the cellular transceiver 220 and/or the local transceiver 230 and/or the servers 240. In a particular implementation, the network 225 may comprise Internet Protocol (IP) or other infrastructure capable of facilitating communication between the mobile device 100 and the servers 240 through the local transceiver 230 or the cellular transceiver 220. In an implementation, the network 225 may comprise cellular communication network infrastructure such as, for example, a base station controller or packet based or circuit based switching center (not shown) to facilitate mobile cellular communication with the mobile device 100. In a particular implementation, the network 225 may comprise local area network (LAN) elements such as WLAN APs, routers and bridges and may in that case include or have links to gateway elements that provide access to wide area networks such as the Internet. In other implementations, the network 225 may comprise a LAN and may or may not have access to a wide area network but may not provide any such access (if supported) to the mobile device 100. In some implementations the network 225 may comprise multiple networks (e.g., one or more wireless networks and/or the Internet). In one implementation, the network 225 may be an NG-RAN including one or more serving gateways (e.g., gNBs) or Packet Data Network gateways. In addition, one or more of the servers 240 an Access and Mobility Management Function (AMF), a Session Management Function (SMF), a Location Management Function (LMF), and a Gateway Mobile Location Center (GMLC).

In particular implementations, and as discussed below, the mobile device 100 may have circuitry and processing resources capable of obtaining location related measurements (e.g. for signals received from GPS or other Satellite Positioning System (SPS) satellites 210, the cellular transceiver 220 or the local transceiver 230) and possibly computing a position fix or estimated location of the mobile device 100 based on these location related measurements. In some implementations, location related measurements obtained by the mobile device 100 may be transferred to a location server such as location management function (LMF) (e.g. which may be one of the one or more servers 240) after which the location server may estimate or determine a location for the mobile device 100 based on the measurements. In the presently illustrated example, location related measurements obtained by the mobile device 100 may include measurements of the SPS signals 174 received from satellites belonging to an SPS or Global Navigation Satellite System (GNSS) such as GPS, GLONASS, Galileo or Beidou and/or may include measurements of signals (such as 222 and/or 232) received from terrestrial transmitters fixed at known locations (e.g., such as the cellular transceiver 220). The mobile device 100 or a separate location server may then obtain a location estimate for the mobile device 100 based on these location related measurements using any one of several position methods such as, for example, GNSS, Assisted GNSS (A-GNSS), Advanced Forward Link Trilateration (AFLT), Observed Time Difference Of Arrival (OTDOA), Round Trip Time (RTT), Received Signal Strength Indication (RSSI), Angle of Arrival (AoA), or Enhanced Cell ID (E-CID) or combinations thereof. In some of these techniques (e.g. A-GNSS, AFLT and OTDOA), pseudoranges or timing differences may be measured at mobile device 100 relative to three or more terrestrial transmitters fixed at known locations or relative to four or more satellites with accurately known orbital data, or combinations thereof, based at least in part, on pilots, positioning reference signals (PRS) or other positioning related signals transmitted by the transmitters or satellites and received at the mobile device 100. Doppler measurements may be made to various signal sources such as the cellular transceiver 220, the local transceiver 230, and satellites 210, and various combinations therein. The one or more servers 240 may be capable of providing positioning assistance data to the mobile device 100 including, for example, information regarding signals to be measured (e.g., signal timing), locations and identities of terrestrial transmitters and/or signal, timing and orbital information for GNSS satellites to facilitate positioning techniques such as A-GNSS, AFLT, OTDOA, RTT, RSSI, AoA and E-CID. For example, the one or more servers 240 may comprise an almanac which indicates locations and identities of cellular transceivers and/or local transceivers in a particular region or regions such as a particular venue, and may provide information descriptive of signals transmitted by a cellular base station or AP such as transmission power and signal timing. In the case of E-CID, the mobile device 100 may obtain measurements of signal strengths for signals received from the cellular transceiver 220 and/or the local transceiver 230 and/or may obtain a round trip signal propagation time between the mobile device 100 and the cellular transceiver 220 or the local transceiver 230. The mobile device 100 may use these measurements together with assistance data (e.g. terrestrial almanac data or GNSS satellite data such as GNSS Almanac and/or GNSS Ephemeris information) received from the one or more servers 240 to determine a location for the mobile device 100 or may transfer the measurements to the one or more servers 240 to perform the same determination. In an embodiment, the server 240 may include an optical flow processor configured to receive image information from the mobile device and to perform the feature analysis (e.g., Optical Character Recognition (OCR), distance and heading measurements, etc.) as described herein.

A mobile device (e.g. mobile device 100 in FIG. 1A) may be referred to as a device, a mobile device, a wireless device, a mobile terminal, a terminal, a mobile station (MS), a user equipment (UE), a SUPL Enabled Terminal (SET) or by some other name and may correspond to a cellphone, smartphone, wrist watch, in-vehicle navigation system, tablet, PDA, tracking device, smart glasses, VR goggles, or some other portable or moveable device. Typically, though not necessarily, a mobile device may support wireless communication such as using GSM, WCDMA, LTE, 5G NR, CDMA, HRPD, Wi-Fi®, BT, WiMax, etc. A mobile device may also support wireless communication using a wireless LAN (WLAN), DSL or packet cable for example. A mobile device may comprise a single entity or may comprise multiple entities such as in a personal area network where a user may employ audio, video and/or data I/O devices and/or body sensors and a separate wireline or wireless modem. An estimate of a location of a mobile device (e.g., mobile device 100) may be referred to as a location, location estimate, location fix, fix, position, position estimate or position fix, and may be geographic, thus providing location coordinates for the mobile device (e.g., latitude and longitude) which may or may not include an altitude component (e.g., height above sea level, height above or depth below ground level, floor level or basement level). Alternatively, a location of a mobile device may be expressed as a civic location (e.g., as a postal address or the designation of some point or small area in a building such as a particular room or floor). A location of a mobile device may also be expressed as an area or volume (defined either geographically or in civic form) within which the mobile device is expected to be located with some probability or confidence level (e.g., 67% or 95%). A location of a mobile device may further be a relative location comprising, for example, a distance and direction or relative X, Y (and Z) coordinates defined relative to some origin at a known location which may be defined geographically or in civic terms or by reference to a point, area or volume indicated on a map, floor plan or building plan. In the description contained herein, the use of the term location may comprise any of these variants unless indicated otherwise.

Figure 3:
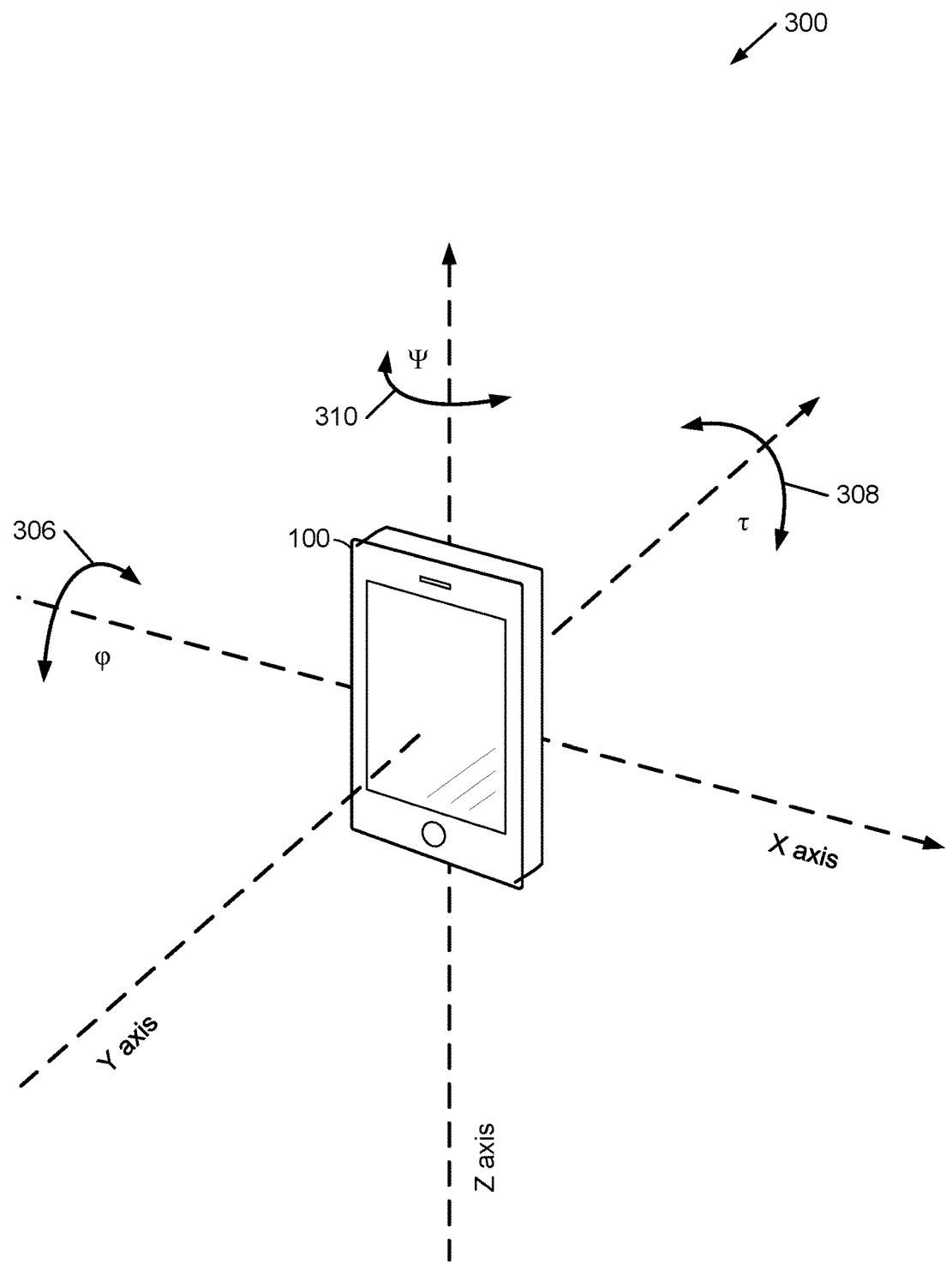
FIG. 3 is an example coordinate system that may be applied to a mobile device.

Referring to FIG. 3, with further reference to FIGS. 1A and 1B, an example coordinate system 300 that may be used, in whole or in part, to facilitate or support measurements obtained via inertial sensors of a mobile device 100 is shown. Inertial sensor measurements may be obtained based, at least in part, on output signals generated by an associated accelerometer 140 or gyroscope 145, for example. An example coordinate system 300 may comprise, for example, a three-dimensional Cartesian coordinate system. The displacement of a mobile device 100 representing, for example, acceleration vibration may be detected or measured, at least in part, by a suitable accelerometer, such as a three-dimensional (3D) accelerometer, for example, with reference to three linear dimensions or axes X, Y, and Z relative to the origin of the example coordinate system 300. It should be appreciated that the example coordinate system 300 may or may not be aligned with a body of mobile device 100. In an implementation a non-Cartesian coordinate system may be used or that a coordinate system may define dimensions that are mutually orthogonal.

At times, rotational motion of mobile device 100, such as orientation changes about gravity, for example, may be detected or measured, at least in part, by a suitable accelerometer with reference to one or two dimensions. For example, in some instances, rotational motion of mobile device 100 may be detected or measured in terms of coordinates (φ (phi), τ (tau)), where phi (φ) represents roll or rotation about an X axis, as illustrated generally by arrow at 306, and tau (τ) represents pitch or rotation about an Y axis, as illustrated generally at 308. As discussed below, rotational motion of mobile device 100 may also be detected or measured by a suitable gyroscope, such as, for example, with respect to X, Y, and Z orthogonal axes. Accordingly, a 3D accelerometer may detect or measure, at least in part, a level of acceleration vibration as well as a change about gravity with respect to roll or pitch dimensions, for example, thus, providing five dimensions of observability (X, Y, Z, φ, τ). Of course, these are merely examples of motions that may be detected or measured, at least in part, with reference to the example coordinate system 300, and claimed subject matter is not limited to particular motions or coordinate system.

In an example, the rotational motion of the mobile device 100 may be detected or measured, at least in part, by suitable gyroscope(s) 145 so as to provide adequate or suitable degrees of observability. The gyroscope(s) 145 may detect or measure rotational motion of the mobile device 100 with reference to one, two, or three dimensions. Thus, in some instances, gyroscopic rotation may, for example, be detected or measured, at least in part, in terms of coordinates (φ, τ, Ψ), where phi (φ) represents roll or rotation 306 about an X axis, tau (τ) represents pitch or rotation 308 about an Y axis, and psi (ψ) represents yaw or rotation about a Z axis, as referenced generally at 310. A gyroscope may typically, although not necessarily, provide measurements in terms of angular acceleration (e.g., a change in an angle per unit of time squared), angular velocity (e.g., a change in an angle per unit of time), or the like. Likewise, here, details relating to motions that may be detected or measured, at least in part, by a gyroscope with reference to the example coordinate system 300 are merely examples, and claimed subject matter is not so limited. The gyroscope(s) 145 may have a bias value and the accuracy of the output may drift with time. In an embodiment, the RTA and alignment techniques described herein may be used to determine the bias value and enable the processor to compensate for the gyroscope biases.

Figure 4A:
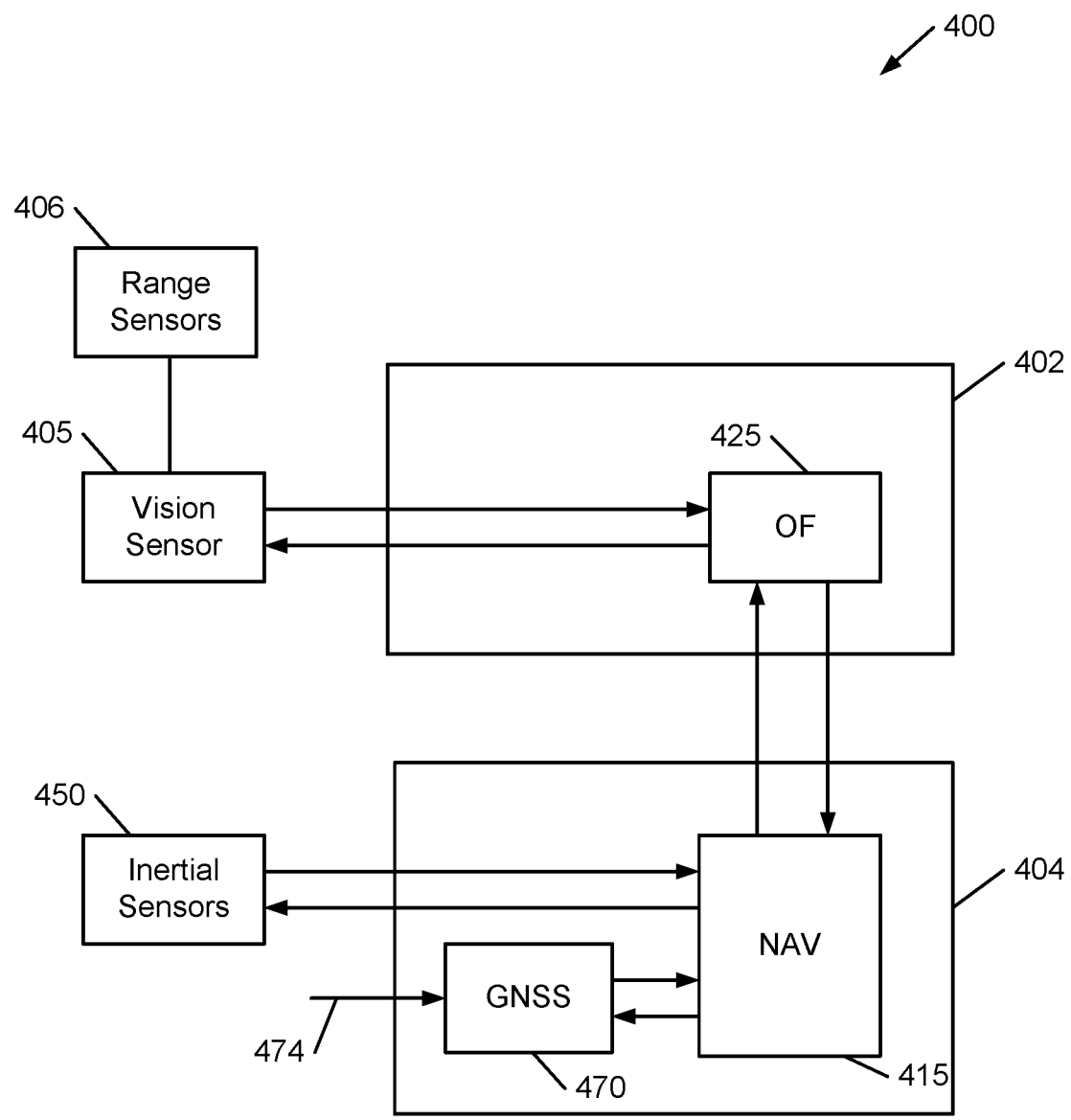
FIG. 4A is a block diagram of an example navigation system with vision sensors.

Referring to FIG. 4A, a block diagram 400 of an example navigation system with vision sensors is shown. The system 400 may include a system-on-chip components, such as a modem, or may be implemented with discrete devices and/or with different systems which are configured to communicate with one another. The system 400 is an example, and not a limitation, as other architectures and components may be used. The distributed system may include an auxiliary processor (AP) 402 and a main processor (MP) 404. The AP 402 is operably connected to the MP 404, and may be configured to respond to indications of events received from the MP 404. In general, the AP 402 is configured to provide optical flow analysis information such as pixel displacement information based on image frames received from a vision sensor 405. The optical flow analysis may include feature detection and OCR methods on the image frames. The vision sensor 405 may also include one or more range sensors 406 such as a depth sensor (e.g., IR ranging components associated with a camera), a lidar device (e.g., laser and coherent light based), and/or a radar device (e.g., millimeter Wave radar components). The vision sensor 405 may be a CMOS imaging technology such as the cameras 105 and the range sensors 406 may be the other sensors 150 in FIG. 1A. The AP 402 includes an optical flow processor (OF) 425 operably connected to the vision sensor 405 and configured to activate the vision sensor 405 and receive image and/or depth information obtained by the range sensors 406. The MP 404 includes a navigation processor (NAV) 415 operably coupled to a GNSS processor 470. Inertial sensors 450 are configured to receive commands from the navigation processor 415 and return inertial data such as output by accelerometers and gyroscopes. For example, a gyroscope 145 is configured to provide angular velocity signals, and the accelerometers 140 are configured to provide specific force signals. The GNSS processor 470 is configured to receive satellite positioning signals 474 and provide position information and time information to the navigation processor 415.

In an example, the navigation processor 415 is configured with a recursive algorithm such as a Kalman filter to estimate states of the distributed system 400. The Kalman filter may receive measurements from the inertial sensors 450, GNSS 470, and the optical flow processor 425 and apply mathematical models to determine estimated orientations and positions. Other positioning methods may be used to provide position information. For example, the mobile device 100 or a separate server 240, may obtain a location estimate for the mobile device 100 based on Assisted GNSS (A-GNSS), Advanced Forward Link Trilateration (AFLT), Observed Time Difference Of Arrival (OTDOA) or Enhanced Cell ID (E-CID). In an embodiment, the AP 402, the MP 404, the vision sensor 405, the range sensors 406, and inertial sensors 450 may be included within a single device, such as the mobile device 100. For example, the AP 402 is an example of the optical flow processor 125, the MP 404 is an example of the navigation processor 115, the vision sensor 405 is an example of the camera(s) 105, and the inertial sensors 450 may include the accelerometer(s) 140, the gyroscope(s) 145, and the other sensors 150. In another embodiment, as depicted in FIG. 4A, the AP 402, the MP 404, vision sensor 405, the range sensors 406 and inertial sensors 450 may be included in separate devices and configured to exchange information via wired or wireless communication paths. In an example, the vision sensor 405 and the range sensors 406 may be installed in a fixed position with respect to a vehicle frame.

Figure 4B:
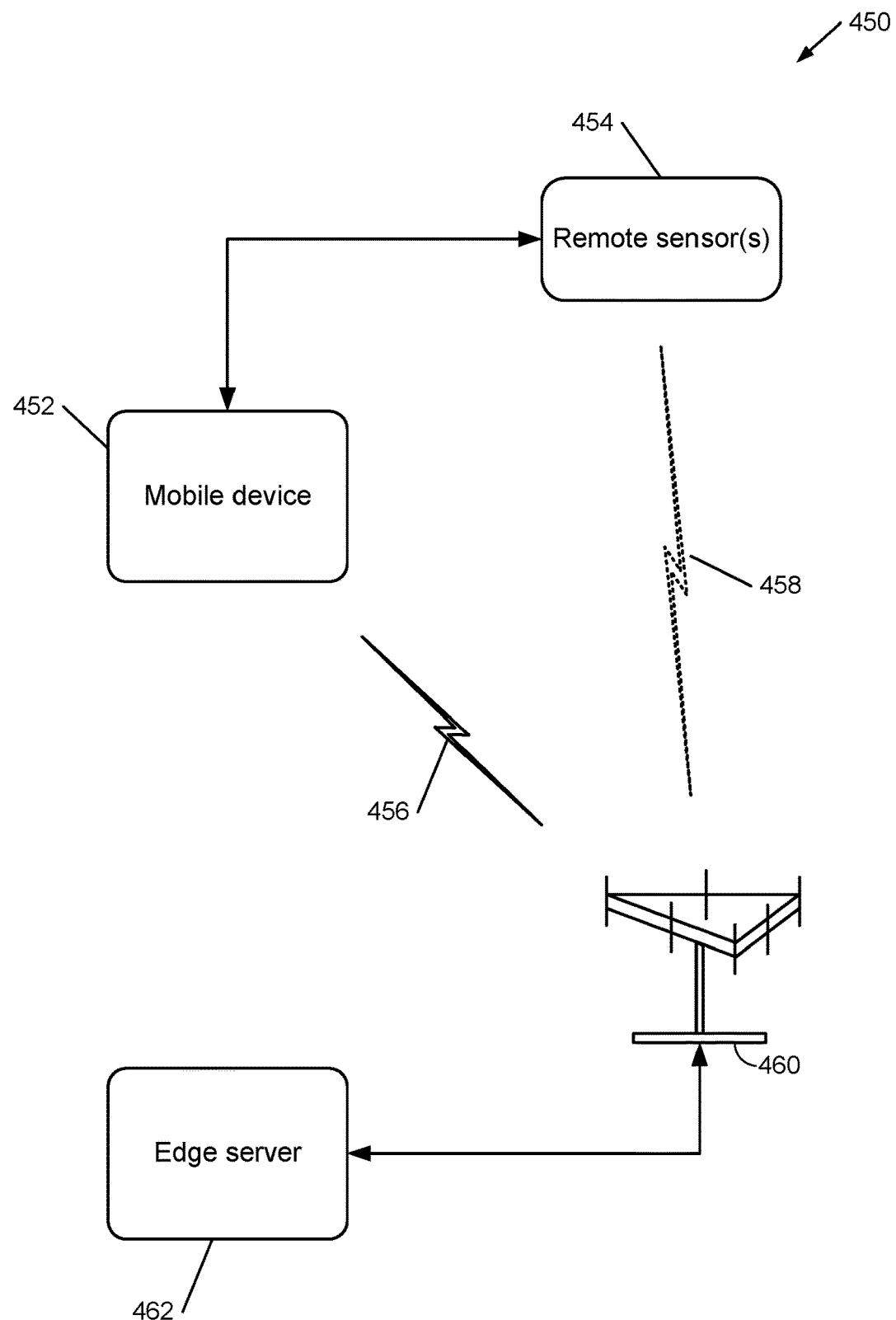
FIG. 4B is a block diagram of an example distributed system for sensor assisted navigation.

Referring to FIG. 4B, a block diagram 450 of an example distributed system for sensor assisted navigation is shown. The diagram 450 includes a mobile device 452 and one or more remote sensors 454. The mobile device 452 may include some or all of the components of the mobile device 100, and the mobile device 100 may be an example of the mobile device 452. The remote sensors 454 may be one or more sensors configured to obtain measurements of the environment proximate to the mobile device 452. For example, the remote sensors 454 may include one or more of remote cameras and other vision sensors, radio frequency (RF) sensing devices, radar, lidar (e.g., laser or coherent light based), inertial sensors, barometers, magnetometers, and other measuring devices. In an embodiment, the remote sensors 454 may be communicatively coupled to the mobile device via one or more wired or wireless connections. For example, in a vehicle application the remote sensors 454 may be cameras, radar, lidar, and other sensors installed on a vehicle and configured to provide image and other data to the mobile device 452 via a wireless technology such as WiFi and/or Bluetooth. Other technologies may also be used. In an example, the remote sensors 454 may be disposed in other devices. For example, image sensors in AR goggles may be the remote sensors 454 and configured to provide image information to the mobile device. Other remote devices such as action cameras, WiFi radar sensors, range detecting device, etc., may also be configured to provide sensor information to the mobile device 452. In operation, the mobile device 452 may be configured to communicate with an edge server 462 via a communication network includes a base station 460 and a first communication link 456. For example, the base station 460 may be in a cellular network and the first communication link 456 may be a radio access technology such as LTE, 5G NR, etc. In an example, the base station 460 may be an access point in a wide area network (WAN) and the first communication link 456 may be based on WiFi, Bluetooth, or radio access technologies. The edge server 462 may be third party mapping application or other location based services provider configured to receive and/or provide positioning information.

In an embodiment, the remote sensors 454 may be configured to provide sensor data to the edge server 462 and/or the mobile device 452 via a second communication link 458 and the base station 460. The second communication link 458 and base station 460 may be cellular based, WAN based, or other radio access technologies. In an example, the edge server 462 may be configured to utilize information provided by the mobile device 452 (e.g., coarse position information) and information provided by the remote sensors 454 (e.g., images, radar/lidar cloud points) to compute a location for the mobile device 452 based on the method described herein. For example, the mobile device 452 may be a smart phone, smart watch, etc. and may provide coarse location information to a third party application such as Google Maps (i.e., the edge server 462). The remote sensors 454 may be smart glasses, AR goggles, etc. associated with the mobile device 452 and configured to obtain images. The third party application may receive both the coarse location information and the images via first communication link 456 (e.g., from the mobile device 452), or via a combination of the first and second communication links 456, 458 (e.g., from the mobile device 452 and the remote sensors 454, respectively). The third party application may combine the bifurcated data sources to improve the accuracy of the position estimate for the mobile device 452.

Figure 5:
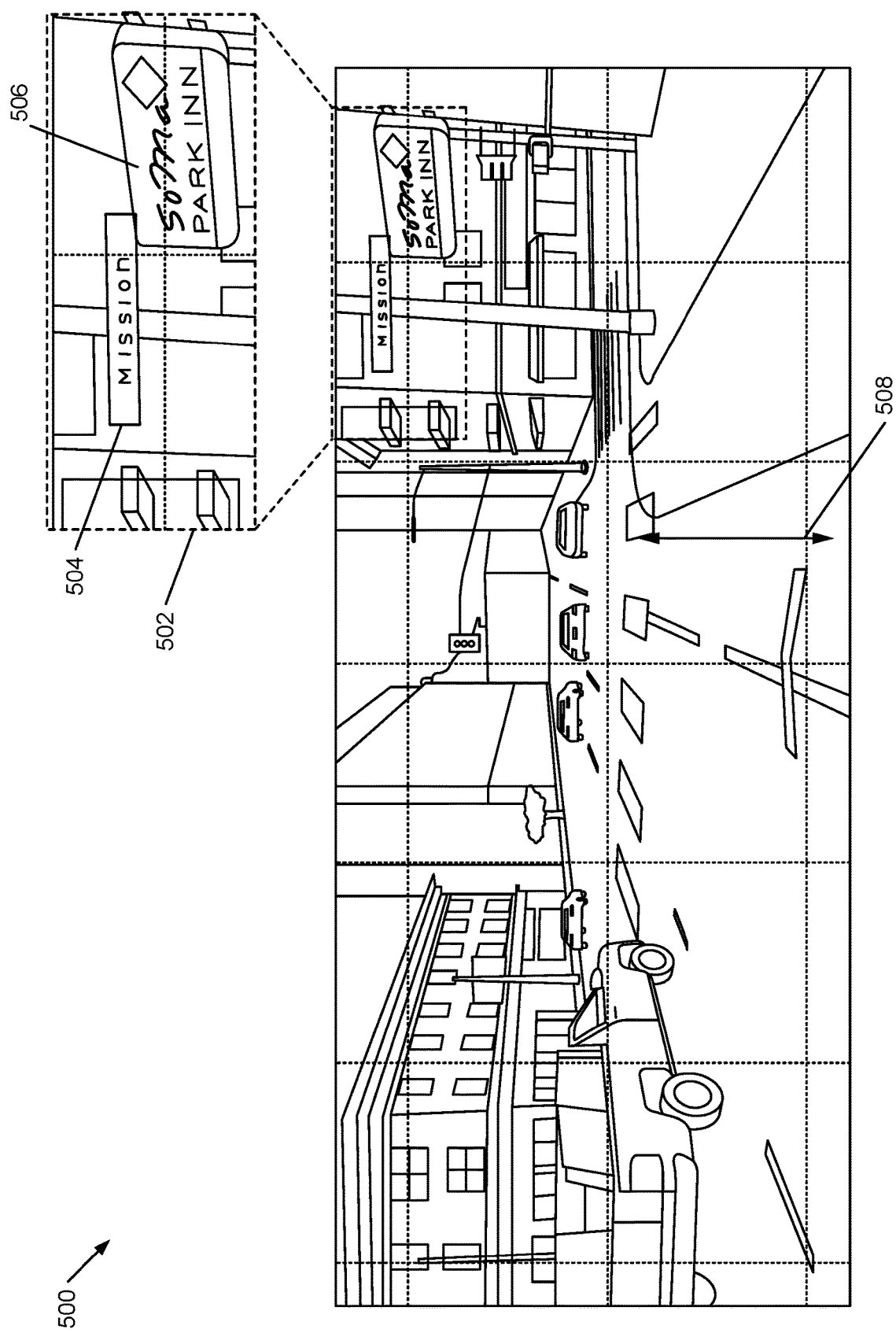
FIG. 5 is an example image with identifiable features obtained by a vision sensor.

Referring to FIG. 5, an example image 500 with identifiable features obtained by a vision sensor is shown. The image 500 is a street view obtained by a vision sensor 405 disposed on the front of a vehicle and oriented in the direction of travel. A sub-image 502 within the image 500 includes two identifiable features including a street sign 504 (i.e., "Mission") and a business sign 506 (e.g., "Soma Park Inn"). The identifiable features 504, 506, are examples and represent the text information that is generally available in public and proprietary mapping applications such as Google Maps, Apple Maps, Waze®, and other mapping service providers. In operation, a mobile device 100 may be configured to obtain a coarse position based on a GNSS position estimate. In an urban environment, such as depicted in the image 500, the GNSS position estimate may have an increased area of uncertainty due to obstructed SV signals (e.g., caused by buildings, nearby vehicles, etc.), and other multipath effects. The mobile device 100 is configured to obtain map information from a service provider based on the coarse GNSS position estimate (e.g., the computed latitude and longitude) and the map information may include geolocated points of interest (POI) information and associated identifiable features such as the text of street names, intersection names, bus stop numbers, business names and addresses. The OF 425 may be configured to utilize computer vision techniques to extract the identifiable features (e.g., street names, business names, addresses, street corner/intersection) from the image 500 (e.g., OCR techniques) based on the corpus of text in the coarse map information. In an example, the text associated with features and POIs in the coarse map information may be used to constrain the OCR solutions. The size of the coarse map information may be based on a configuration range from the GNSS position estimate (e.g., 100, 200, 500, 1000 yards, etc.). Other factors such as current speed and the capabilities of the mobile device 100 may be used to determine the scope of coarse map information obtained. In an embodiment, the output of the range sensors 406 and/or the vision sensor 405 may be utilized to determine a distance estimate 508 to an identifiable feature such as a crosswalk, a street light, a street sign, a traffic light, an intersection, etc. The range sensors 406 may be used in conjunction with inertial measurement devices (e.g., gyroscopes 145, accelerometers 140) to determine a bearing and elevation to an object based on the coordinate system 300 and the orientation of the range sensor 406 (e.g., bore sight). The pre-determined location of the identifiable features and/or the distance to the identifiable features may be used to improve the accuracy of the GNSS position estimate.

In an embodiment, the mobile device 100 may be configured with one or more computer vision algorithms as known in the art to identify features such as, for example, crosswalks, building corners, side walk corners, stop sign marker lines, and sign text. The algorithms may perform a preprocess or other filtering step on the image such as applying a color threshold, an S channel gradient threshold, and a region of interest filter. A perspective transform may be used to transform the image from a forward perspective to a birds eye view. A transformation matrix may be computed and the image may be warped based on the transformation matrix. Histogram peaks may be used to determine markings, such as crosswalks, stop sign markings, or other identifiable features on the road. Sliding window techniques may be used to extract active pixels and run polyfit processes to construct lines based on the active pixels. The relative distances between lane markings may be used to distinguish between lane markers and crosswalks. Pre-calibrated camera parameters or a camera in combination with accelerometer and gyroscope input may be used to determine a relative distance from the camera to the identifiable feature, such as a crosswalk. Other algorithms and image processing techniques may also be used.

Figure 6:
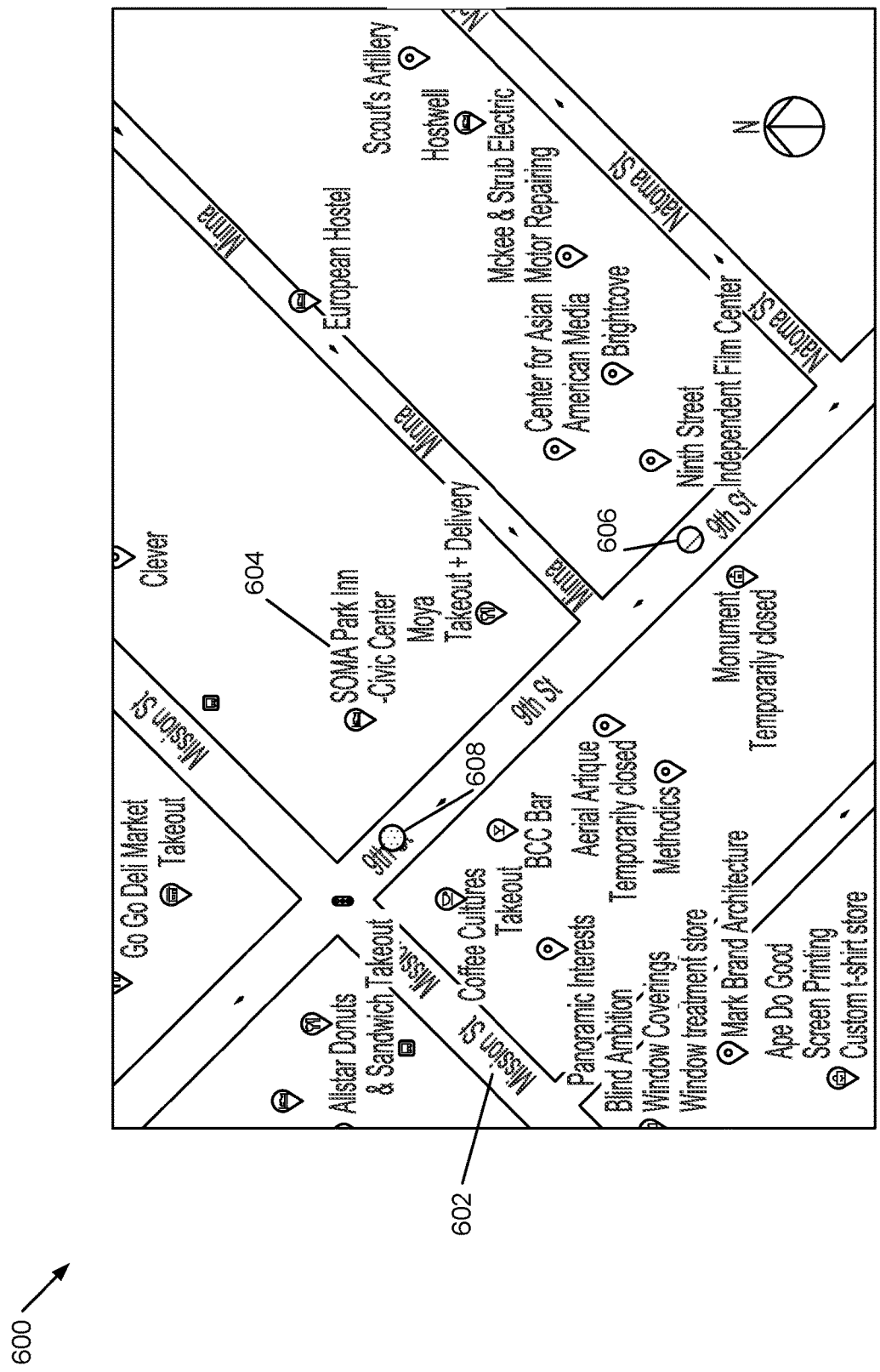
FIG. 6 is an example coarse map associate with the image in FIG. 5 including identifiable feature information.

Referring to FIG. 6, an example coarse map 600 associated with the image 500 in FIG. 5 is shown. The coarse map 600 includes location and text information associated with identifiable features such as a street name 602 (i.e., "Mission") and a business name 604 (i.e., "Soma Park Inn"). In an example, the mobile device 100 may obtain an initial GNSS position estimate 606 indicating a current location on 9th Street, between Minna and Natoma St. (as depicted in FIG. 6). Concurrent with obtaining the initial GNSS position estimate 606, the mobile device also obtains the image 500 in FIG. 5. The OF processor 425 may be configured to determine identifiable features based on the text information associated with the coarse map 600. In an example, the OF processor 425 may utilize OCR techniques based on the street names in the coarse map information (e.g., Natoma, Minna, Mission, $9^{th}$ St). In an example, the OF processor 425 may utilize OCR techniques based on the street names and text associated with other POIs (e.g., business and building names) in the coarse map information (e.g., Moya, Soma Park Inn, Coffee Cultures, BCC Bar, etc.). Constraining the OCR solutions based on the coarse map information may enable more robust and faster text recognition. In an embodiment, the OF processor 425 may be configured to obtain OCR results based on the image 500 alone (i.e., without being constrained).

Referring to the street sign 504 in FIG. 5, the navigation processor 415 may utilize the identifiable feature detected by the OF processor 425 and the coarse map data to update the GNSS position estimate. The identification and OCR of the street sign 504 (i.e., "Mission Street") proximate to the mobile device 100 may be used to generate an updated GNSS position estimate 608 indicating that the current position is northwest of the initial GNSS position estimate 606 (i.e., closer to Mission St.). Other identifiable features such as the business name 604 may also be used to update the position estimate. The distance estimate 508 may also be used to update the position estimate. For example, the distance estimate 508 indicates an estimated distance to the intersection of Mission St and $9^{th}$ street depicted on the coarse map 600. Comparing the identifiable features (e.g., readable street signs) against the coarse map feature data may help eliminate outlying position estimates and provide improved positioning accuracy. Distance and/or heading measurements may also be used as measurement updates in Kalman filtering algorithms used for determining a position.

Figure 7:
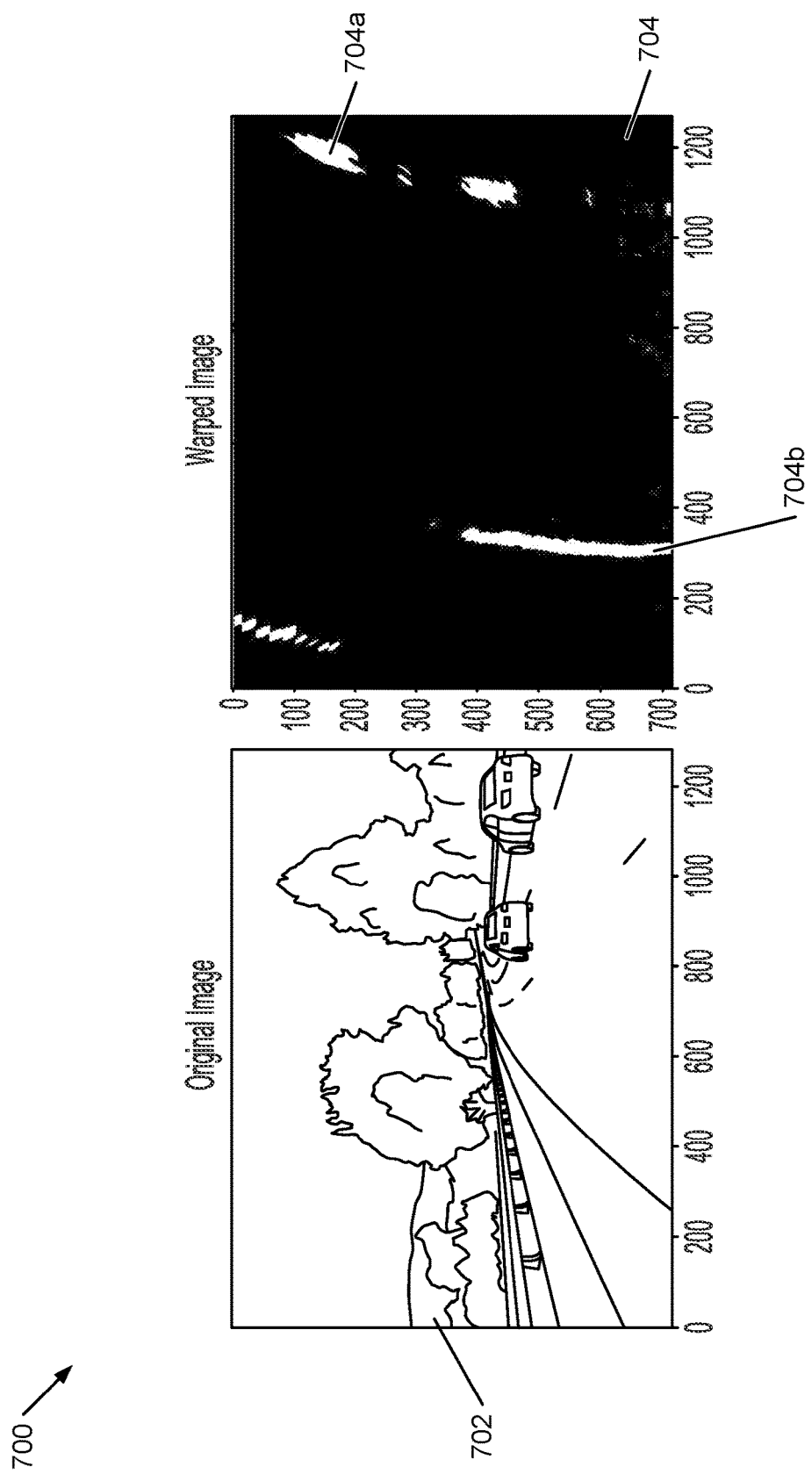
FIG. 7 is an example transformation of an image obtained with an image sensor.

Referring to FIG. 7, an example transformation 700 of an image 702 obtained with the vision sensor 405 is shown. In a use case, the vision sensor 405 may be disposed on a vehicle and oriented to obtain images in the direction of the vehicle. A street image 702 may include natural and man-made topographical features such as lane markers, jersey barriers, guardrails, road shoulder lanes, and other features based on the perspective of the vision sensor 405. The optical flow processor 425 may be configured to transform the street image 702 to a birds eye view warped image 704 using perspective transformation techniques. Other image resolution and adjustment techniques may also be used (e.g., contrast adjustment, binarization, sharpening, etc.). For example, the warped image 704 may highlight the highway lane markings including a series of dashed right lane marks 704a and a left lane stripe 704b. Other features may also be identified.

Figure 8:
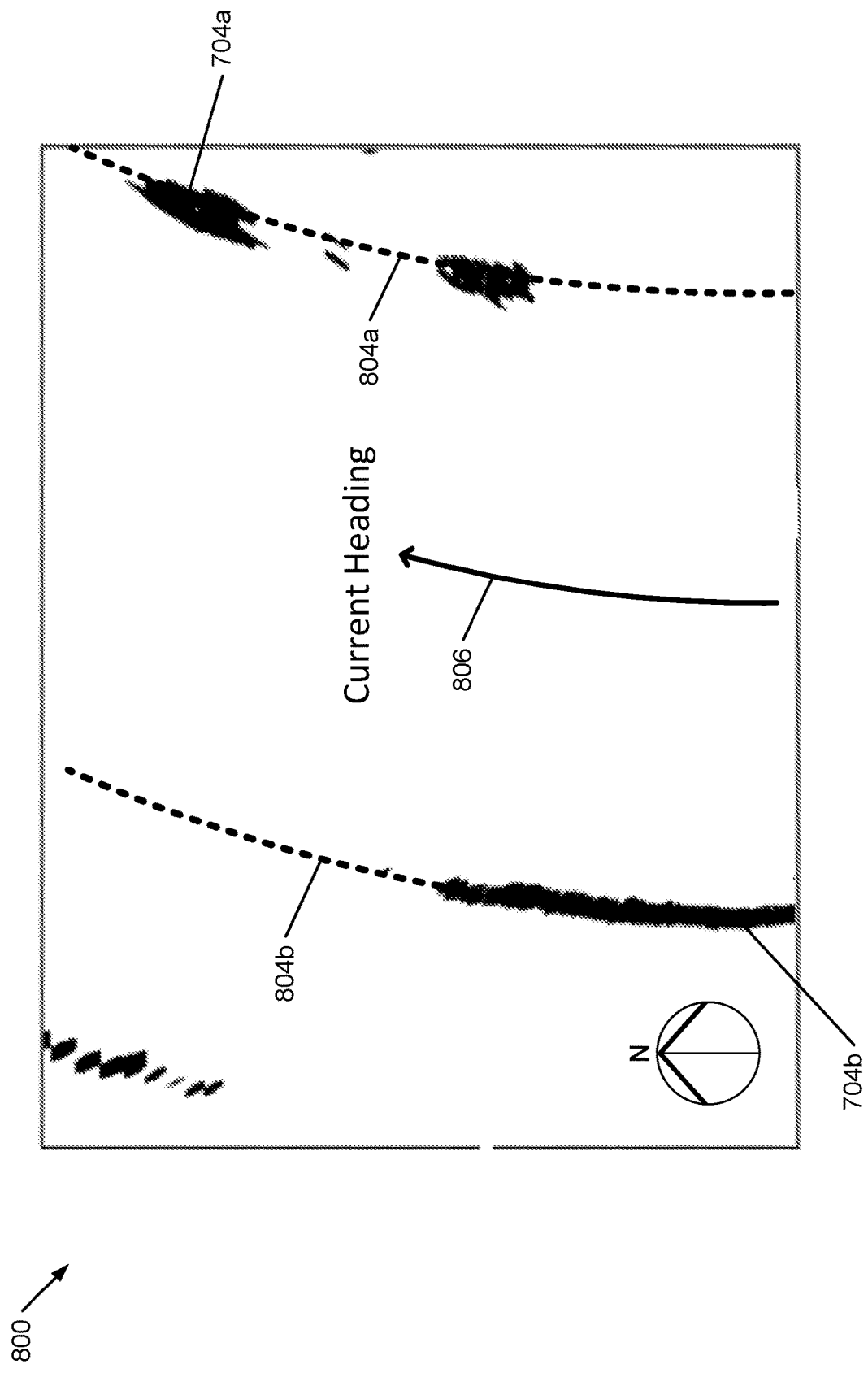
FIG. 8 is an example of a heading measurement based on the image of FIG. 7

Referring to FIG. 8, an example of a heading measurement based on the warped image 704 is shown. An image 800 is the negative image of the warped image 704 and is provided to facilitate the description of the heading measurement. The image 800 is an example, and not a limitation.

The OF processor 425 may be configured to determine the contour of the image features such as the dashed right lane marks 704a and the left lane stripe 704b. For example, the OF processor 425 may utilize image processing techniques to obtain a right lane boundary 804a based on the dashed right lane marks 704a, and a left lane boundary 804b based on the left lane stripe 704b. In an embodiment, the mobile device 100 may be configured to obtain coarse map information based on an initial GNSS position estimate and the navigation processor 415 may be configured to match the angle and/or curvature of the right and left lane boundaries 804a-b to the roads in coarse map data to determine a current heading 806 of the vehicle. The heading information derived from the image may be used as an input to a recursive algorithm, such as a Kalman filter, configured to generate a position estimate.

In an embodiment, the vision sensor 405 may be configured to obtain images periodically and/or based on preestablished trigger conditions. In an example, a camera duty cycle may be implemented for activating the vision sensor 405 integration with the position estimates. Relative turn trajectory and/or user dynamics may be used to determine the duty cycles. For example, a turning vehicle may utilize a higher duty cycle as compared to a vehicle that is travelling in a straight line. The coarse map information may also be used to determine the duty cycle. For example, the proximity to intersections may be used to increase the duty cycle as compared to open road with fewer intersections. Other states of the mobile device 100 may also be used a trigger conditions to activate the vision sensor 405 for navigation applications.

Figure 9:
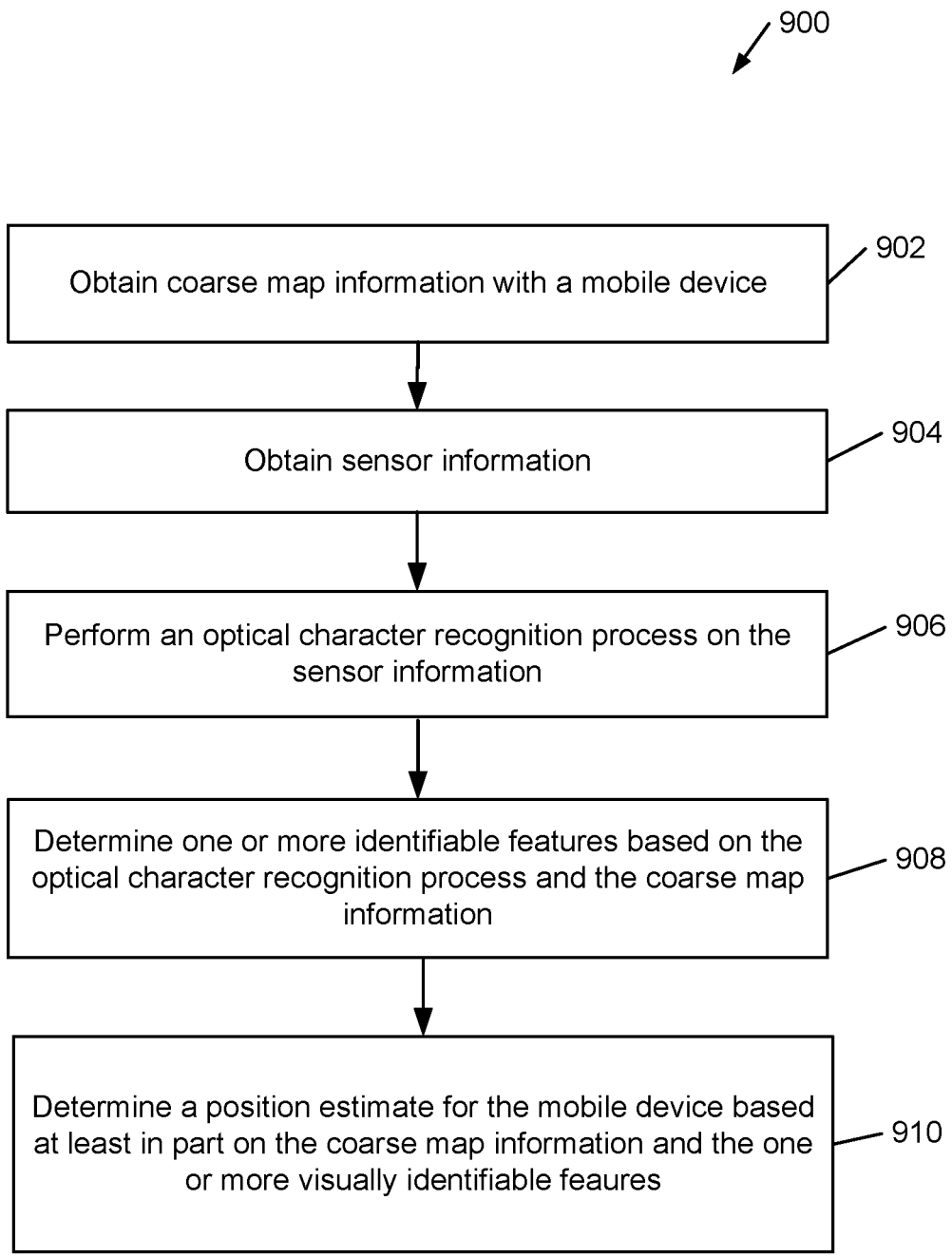
FIG. 9 is a flow diagram of a method for determining a position estimate of a mobile device based on identifiable features in an image.

Referring to FIG. 9, with further reference to FIGS. 1A-8, a method 900 for determining a position estimate of a mobile device based on identifiable features in an image includes the stages shown. The method 900 is, however, an example and not limiting. The method 900 can be altered, e.g., by having stages added, removed, rearranged, combined, performed concurrently, and/or having single stages split into multiple stages. The method 900 may be performed with integrated devices within a mobile device, with multiple discrete components operable coupled in a mobile device, with multiple devices which are communicatively coupled, and/or remotely via network connections with different stages being performed by different sensors and different processors.

At stage 902, the method includes obtaining coarse map information. The wireless transceiver 130 may be a means for obtaining the coarse map information. In an embodiment, the mobile device 100 may be configured to provide location coordinates (e.g., lat./long.) to a third party mapping service provider (e.g., Google maps, Apple Maps, etc.) via the network 225 to obtain coarse map information in an area proximate to a coarse position of the mobile device. The location coordinates may be based on SV signals received by the mobile device 100, or other terrestrial navigation techniques based on signals received via the wireless transceiver 130. The coarse position may be based on positioning techniques such as, for example, A-GNSS, AFLT, OTDOA, RTT, RSSI, AoA and E-CID. The coarse map information may be based on existing map datasets, and is not dependent on building and utilizing image specific mapping data. The proximate area included in the coarse map information may be based on a configuration option or other application criteria (e.g., a position uncertainty value) and may encompass a range of 100, 200, 500, 1000 yards around the location of the mobile device. The coarse map information may include georeferenced POIs such as street names and intersection locations, business names and address, or other labels corresponding to identifiable features and their corresponding locations. In an example, the mobile device 100 may have coarse map information stored a local memory 160. In an example, the mobile device 100 may parse the coarse map information to determine the street names and intersection locations that are proximate to the mobile device. The mobile device 100 may be configured to parse other visually identifiable features such as business signs and addresses, bus station signs, highway signs, overpass signs, street lights, etc. such that each of the visually identifiable features is associated with a known location in the coarse map information.

At stage 904, the method includes obtaining sensor information. The vision sensor 405 or the remote sensor 454 may be a means for obtaining the sensor information. In an example, the vision sensor 405 or the remote sensor 454 may be a camera such as the second camera 105*b*, or another camera such as a vehicle mounted dashboard camera, AR goggles, or other sensors configured to obtain images proximate to the mobile device. For example, the vision sensor 405 or the remote sensor 454 may obtain a street view of an urban environment such as the image 500 in FIG. 5. In an embodiment, the sensor information may be based on data received from one or more remote sensors 454. For example, a radar or lidar system may obtain ranges and bearings to one or more points (e.g., a point cloud). Other sensors may be configured to provide other information. The sensor information may be obtained on demand or periodically, such as based on a sensor duty cycle.

At stage 906, the method includes performing an optical character recognition process on the sensor information. The OF 425 or the processor 111 may be a means for performing the OCR process. In an embodiment, the vision sensor 405 and/or the remote sensors 454 may obtain images of the area proximate to the mobile device 100. The OF 425 or the processor 111 may be configured to utilize OCR and other computer vision techniques on sensor information to extract identifiable features (e.g., street names, business names, addresses, street corner/intersection) from the sensor information obtained at stage 904.

At stage 908, the method includes determining one or more identifiable features based on the optical character recognition process and the coarse map information. In an embodiment, the computer vision techniques may utilize information (e.g., text) associated with the one or more visually identifiable features in the sensor information to identify locations in the coarse map information. For example, the results of the OCR process at stage 906 may be compared to text associated with features and POIs in the coarse map information. In an embodiment, the coarse map information may be used to constrain the OCR solutions. Other constraint based techniques may also be used to improve the efficiency of the OCR process. Other identifiable features associated with a sensor input may be included in the coarse map information. For example, geolocated objects such as road signs or other reflectors may be configured to provide a detectable return signature. The locations and corresponding identification information may be included in the coarse map information.

At stage 910, the method includes determining a position estimate for the mobile device based at least in part on the coarse map information and the one or more identifiable features. The navigation processor 415 or the processor 111 is a means for determining a position estimate. The navigation processor 415 may be configure to determine the location of a identifiable feature based on the location of the feature in the coarse map information. For example, referring to FIG. 6, the identification of "Mission Street" proximate to the mobile device 100 may be used to generate an updated GNSS position estimate 608 indicating that the current position is northwest of the initial GNSS position estimate 606 (i.e., the updated GNSS position estimate 608 is closer to Mission St.). In an embodiment, the mobile device 100 may be configured to utilize the output of one or more range sensors 406 or remote sensors 454 to further refine the position estimate. For example, the range sensors 406, remote sensors 454 and/or the vision sensor 405 may be utilized to determine a distance estimate 508 to an identifiable feature such as a crosswalk, a street light, a street sign, an intersection, etc.

Figure 10:
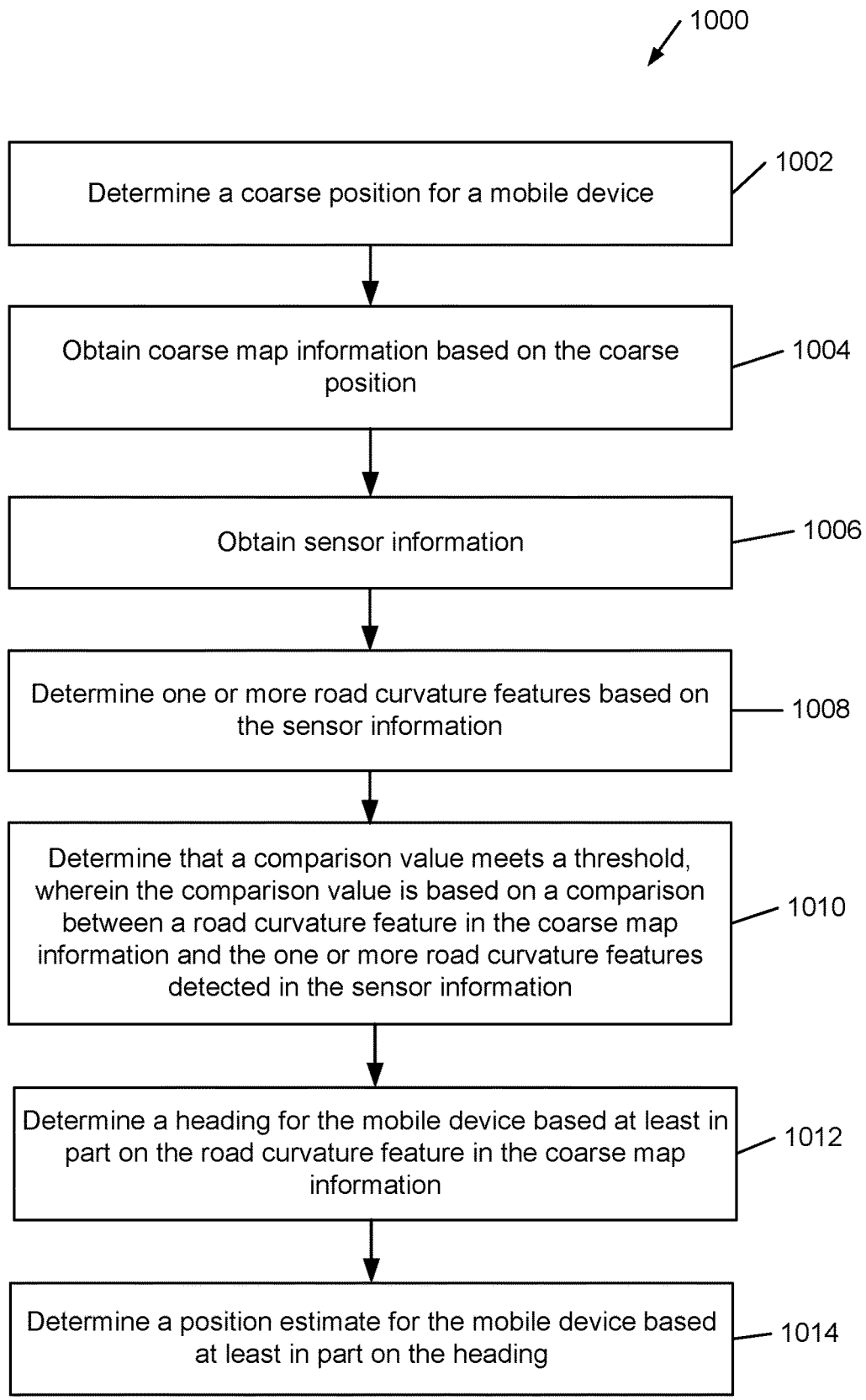
FIG. 10 is a flow diagram of a method for determining a position estimate of a mobile device based in part on a heading input.

Referring to FIG. 10, with further reference to FIGS. 1A-8, a method 1000 for determining a position estimate of a mobile device based in part on a heading input includes the stages shown. The method 1000 is, however, an example and not limiting. The method 1000 can be altered, e.g., by having stages added, removed, rearranged, combined, performed concurrently, and/or having single stages split into multiple stages.

At stage 1002, the method includes determining a coarse position of a mobile device. The GNSS receiver 170 or the wireless transceiver 130 may be means for determining the coarse position. The coarse position may be based on SV signals received by the mobile device 100, or other terrestrial navigation techniques based on signals received via the wireless transceiver 130. The coarse position may be based on positioning techniques such as, for example, A-GNSS, AFLT, OTDOA, RTT, RSSI, AoA and E-CID.

At stage 1004, the method includes obtaining coarse map information based on the coarse position. The wireless transceiver 130 may be a means for determining the coarse position. In an embodiment, the mobile device 100 may be configured to provide location coordinates (e.g., lat./long.) to a third party mapping service provider (e.g., Google maps, Apple Maps, etc.) via the network 225 to obtain coarse map information in an area proximate to the coarse position. The coarse map information may be existing map information (e.g., publicly available) and is not dependent on building and utilizing image specific mapping data. The proximate area may be based on a configuration option or other application criteria (e.g., a position uncertainty value) and may encompass a range of 100, 200, 500, 1000 yards around the coarse position measurement. The coarse map information may include georeferenced POIs such as street names and intersection locations, business names and addresses, or other labels corresponding to identifiable features and their corresponding locations. In an example, the mobile device 100 may have coarse map information stored a local memory 160.

At stage 1006, the method includes obtaining sensor information. The vision sensor 405 or the remote sensor may be a means for obtaining sensor information. In an example, the vision sensor 405 or the remote sensor 454 may be a camera such as the second camera 105*b*, or another camera such as a vehicle mounted dashboard camera, AR goggles, or other sensors configured to obtain images proximate to the mobile device. In an embodiment, a VPS navigation device may be installed on the dashboard of a vehicle or autonomous delivery system and may include a camera pointing towards the direction of motion. The vision sensor 405 and/or the remote sensor 454 may, for example, be configured to obtain the street image 702 of a roadway the vehicle is currently traversing upon. In an embodiment, the images may be obtained based on a vision sensor duty cycle.

In an example, the image may be based on input from other sensors such as radar or lidar (e.g., lidar point clouds, radar point data). Other sensors may be configured to provide other information. The sensor information may be obtained on demand or periodically, such as based on a sensor duty cycle.

At stage 1008, the method includes determining one or more road curvature features based on the sensor information. The OF processor 425 or the processor 111 may be a means for determining one or more road curvature features. In an example, the sensor information may be an image such as the street image 702 which may include natural and man-made topographical features such as lane markers, jersey barriers, guardrails, road shoulder lanes, and other features based on the perspective of the vision sensor 405. The OF processor 425 or the processor 111 may be configured to transform the street image 702 to the birds eye view warped image 704 using perspective transformation techniques. In an embodiment, referring to FIG. 8, the OF processor 425 or the processor 111 may utilize image processing techniques to obtain a right lane boundary 804*a* based on the dashed right lane marks 704*a*, and a left lane boundary 804*b* based on the left lane stripe 704*b*. The right and left boundaries 804*a-b* may be used to determine the curvature of the road. In an embodiment, the one or more road curvature features may be based on radar and/or lidar data obtained by the remote sensors 454. Other sensor processing techniques may also be used to determine the curvature.

At stage 1010, the method includes determining that a comparison value meets a threshold, wherein the comparison value is based on a comparison between a road curvature feature in the coarse map information and the one or more road curvature features detected in the sensor information. The navigation processor 415 or the processor 111 may be a means for determining if the comparison meets the threshold value. In an example, the mobile device 100 obtains the coarse map information at stage 1004 and the navigation processor 415 or processor 111 may be configured to compare the angle and/or curvature of the right and left lane boundaries 804*a-b* to the roads in the coarse map data to determine a current heading 806 of the vehicle. For example, a roadway may be identified based on the coarse position information (e.g., US 5 Northbound), and a comparison algorithm may be based on pixel analysis of identified roadway and the detected curvature. An example comparison algorithm may include a convolution to transpose the curvature information (i.e., the kernel) along the identified roadway in the forward and backwards direction to find a solution. The threshold value may be established based on a probability factor associated with the comparison algorithm. For example, a higher threshold value may indicate an increased likelihood of an actual match between the road curvature feature and the coarse map information. Other matching algorithms may also be used.

At stage 1012, the method includes determining a heading for the mobile device based at least in part on the road curvature feature in the coarse map information. The navigation processor 415 or the processor 111 may be a means for determining a heading for the mobile device. In an embodiment, the navigation processor 415 or processor 111 may be configured to compute a heading based on the georeferenced coarse map information. For example, the coordinate information associated with the coarse map (e.g., North Up) may be used as a reference for determining a heading (i.e., angle) of the location on the matching roadway segment. The resulting heading information may be used as an input to a recursive algorithm utilized for determining a position estimate.

At stage 1014, the method includes determining a position estimate for the mobile device based at least in part on the heading. The navigation processor 415 or the processor 111 is a means for determining the position estimate. In an embodiment, the navigation processor 415 is configured with a recursive algorithm (e.g., Kalman filter) to estimate the states of mobile device 100. The recursive algorithm may receive measurements from the inertial sensors 450, GNSS 470, in addition to the heading information based on the OF processor 425, and apply mathematical models to determine estimated orientations and positions. The heading information determined at stage 1012 may be used to improve the accuracy of the GNSS position estimates.

Figure 11:
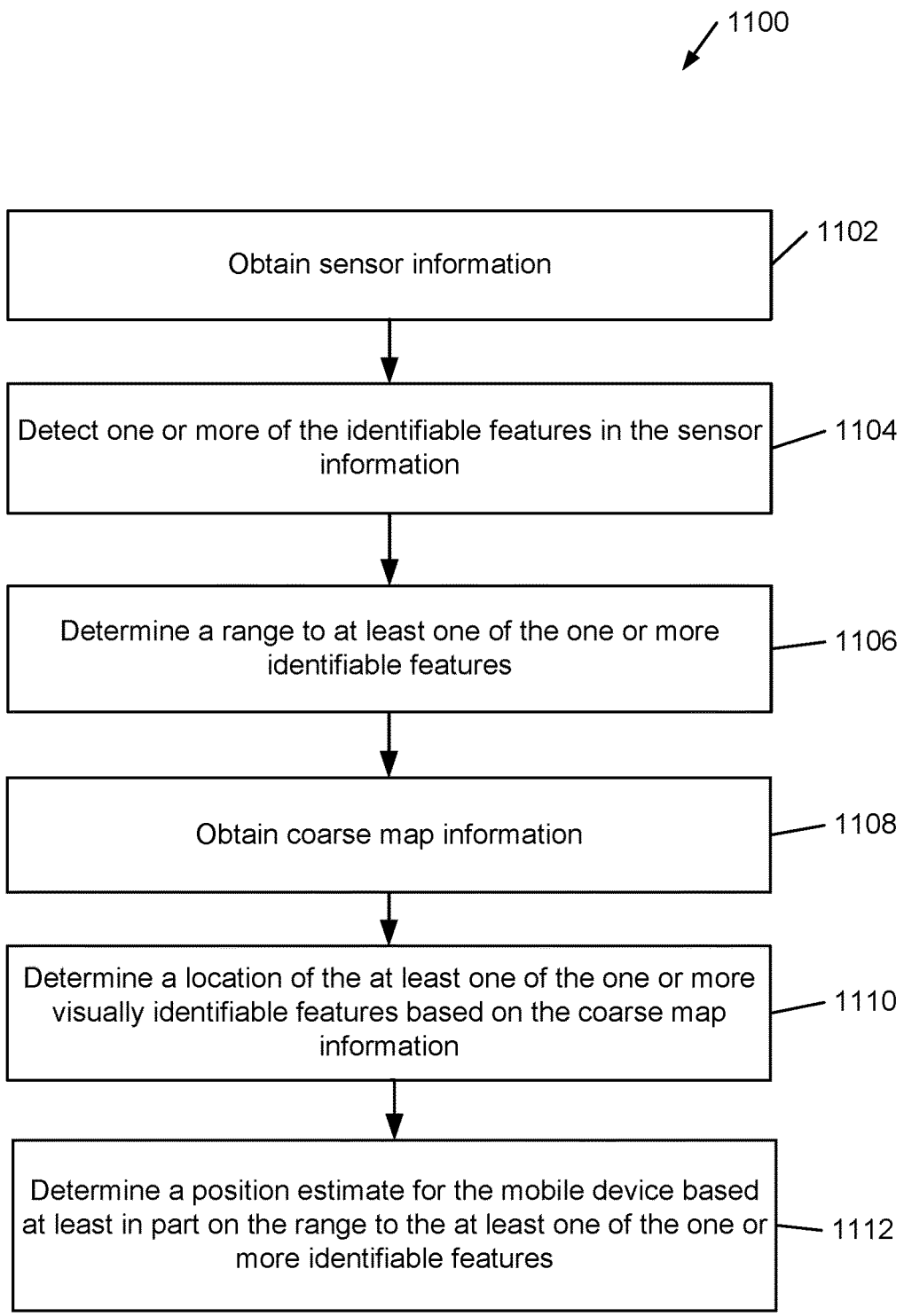
FIG. 11 is a flow diagram of a method for determining a position estimate of a mobile device based in part on a range to a feature.

Referring to FIG. 11, with further reference to FIGS. 1A-8, a method 1100 for determining a position estimate of a mobile device based on a range to a feature includes the stages shown. The method 1100 is, however, an example and not limiting. The method 1100 can be altered, e.g., by having stages added, removed, rearranged, combined, performed concurrently, and/or having single stages split into multiple stages.

At stage 1102, the method includes obtaining sensor information. The vision sensor 405 and the remote sensors 454 may be means for obtaining the sensor information. In an example, the vision sensor 405 may be a camera such as the second camera 105*b*, or another camera such as a vehicle mounted dashboard camera, a camera in another device such as AR goggles, and configured to obtain images proximate to the mobile device. For example, the vision sensor 405 may obtain a street view of an urban environment such as the image 500 in FIG. 5. In an embodiment, the sensor information may be based on data received from one or more remote sensors 454. For example, a radar or lidar system may obtain ranges and bearings to one or more points (e.g., a point cloud). Other sensors may be configured to provide other information. The sensor information may be obtained on demand or periodically, such as based on a sensor duty cycle.

At stage 1104, the method includes detecting one or more identifiable features in the sensor information. The OF 425 and the processor 111 may be means for detecting one or more identifiable features. In an example, the sensor information may be an image and the OF 425 may be configured with one or more computer vision algorithms to identify features such as crosswalks, building corners, side walk corners, stop sign marker lines, intersections, traffic light, street light, and other features. The algorithms may perform a preprocess or other filtering step on the image such as applying a color threshold, an S channel gradient threshold, and a region of interest filter. A perspective transform may be used to transform the image from a forward perspective to a birds eye view. A transformation matrix may be computed and the image may be warped based on the transformation matrix. Histogram peaks may be used to determine markings, such as crosswalks, stop sign markings, or other identifiable features on the road. The processor 111 may be configured to identify radar and/or lidar return information based on signal strength, doppler shifts or the phase of the return signal. For example, pre-configured reflectors or other objects (e.g., traffic lights, street signs, etc.) may provide an identifiable radar or lidar return signal. The memory 160 may include a data structure to correlate a return signal with an object.

At stage 1106, the method includes determining a range to at least one of the one or more identifiable features. The OF 425 and the processor 111 may be a means for determining a range to an identifiable feature. In an example, the sensor information may be an image and pre-calibrated camera parameters or a camera in combination with accelerometer and gyroscope input may be used to determine a relative distance from the camera to the identifiable feature detected at stage 1104. In an embodiment, the range sensors 406 and/or the remote sensors 454 may be utilized to determine a range to the identifiable features. The range sensors 406 may be used in conjunction with inertial measurement devices (e.g., gyroscopes 145, accelerometers 140) to determine a bearing and elevation to an object based on the coordinate system 300 and the orientation of the range sensor 406 (e.g., bore sight). The one or more remote sensors 454 may be in a remote device and configure to range information independently (e.g., without input from the inertial measurement devices). In an example, known distances based on transportation and/or civil standards (e.g., the standard distances between lane markings) may be used to distinguish between features and estimate ranges to features.

At stage 1108, the method includes obtaining coarse map information. The wireless transceiver 130 and the processor 111 may be means for obtaining the coarse map information. In an embodiment, the mobile device 100 may be configured to provide location coordinates (e.g., lat./long.) to a third party mapping service provider (e.g., Google maps, Apple Maps, etc.) via the network 225 to obtain coarse map information in an area proximate to the mobile device. The location coordinates may be based on SV signals received by the mobile device 100, or other terrestrial navigation techniques based on signals received via the wireless transceiver 130. The coarse position may be based on positioning techniques such as, for example, A-GNSS, AFLT, OTDOA, RTT, RSSI, AoA and E-CID. The coarse map information may be based on existing map datasets, and is not dependent on building and utilizing image specific mapping data. The proximate area included in the coarse map information may be based on a configuration option or other application criteria (e.g., a position uncertainty value) and may encompass a range of 100, 200, 500, 1000, etc., yards around the location of the mobile device.

At stage 1110, the method includes determining a location of the at least one of the one or more identifiable features based on the coarse map information. The navigation processor 415 or the processor 111 may be a means for determining a location of an identifiable features. In an embodiment, the coarse map information may include geo-referenced POIs such as street names and intersection locations, business names and addresses, or other labels corresponding to identifiable features and their corresponding locations. The navigation processor 415, the processor 111, or other processors on the mobile device 100, may be configured to parse the coarse map information to determine the street names, intersection locations, business signs and addresses, bus station signs, highway signs, overpass signs, street lights, etc. such that each of the visually identifiable features is associated with a known location in the coarse map information.

At stage 1112, the method includes determining a position estimate for the mobile device based at least in part on the range to the at least one of the one or more identifiable features. The navigation processor 415 or the processor 111 may be a means for determining a position estimate. The navigation processor 415 and/or the processor 111 may be configure to determine the location of a visually identifiable feature based on the location of the feature in the coarse map information. For example, referring to FIGS. 5 and 6, the identification of "Mission Street" in the coarse map information may be used in conjunction with the distance estimate 508 (i.e., the range determined at stage 1106) to determine the position estimate. Other range, sensor, and bearing information may also be used to determine the position estimate. In an embodiment, a remote server such as the edge server 462 may be configured to determine the position estimate based on the coarse position estimate and the sensor information. For example, the mobile device 452 and/or the remote sensors 454 may be configured to provide sensor information and the edge server 462 may be configured to perform the method 1100.

Reference throughout this specification to "one example", "an example", "certain examples", or "exemplary implementation" means that a particular feature, structure, or characteristic described in connection with the feature and/or example may be included in at least one feature and/or example of claimed subject matter. Thus, the appearances of the phrase "in one example", "an example", "in certain examples" or "in certain implementations" or other like phrases in various places throughout this specification are not necessarily all referring to the same feature, example, and/or limitation. Furthermore, the particular features, structures, or characteristics may be combined in one or more examples and/or features.

Some portions of the detailed description included herein are presented in terms of algorithms or symbolic representations of operations on binary digital signals stored within a memory of a specific apparatus or special purpose computing device or platform. In the context of this particular specification, the term specific apparatus or the like includes a general purpose computer once it is programmed to perform particular operations pursuant to instructions from program software. Algorithmic descriptions or symbolic representations are examples of techniques used by those of ordinary skill in the signal processing or related arts to convey the substance of their work to others skilled in the art. An algorithm is here, and generally, is considered to be a self-consistent sequence of operations or similar signal processing leading to a desired result. In this context, operations or processing involve physical manipulation of physical quantities. Typically, although not necessarily, such quantities may take the form of electrical or magnetic signals capable of being stored, transferred, combined, compared or otherwise manipulated. It has proven convenient at times, principally for reasons of common usage, to refer to such signals as bits, data, values, elements, symbols, characters, terms, numbers, numerals, or the like. It should be understood, however, that all of these or similar terms are to be associated with appropriate physical quantities and are merely convenient labels. Unless specifically stated otherwise, as apparent from the discussion herein, it is appreciated that throughout this specification discussions utilizing terms such as "processing," "computing," "calculating," "determining" or the like refer to actions or processes of a specific apparatus, such as a special purpose computer, special purpose computing apparatus or a similar special purpose electronic computing device. In the context of this specification, therefore, a special purpose computer or a similar special purpose electronic computing device is capable of manipulating or transforming signals, typically represented as physical electronic or magnetic quantities within memories, registers, or other information storage devices, transmission devices, or display devices of the special purpose computer or similar special purpose electronic computing device.

Wireless communication techniques described herein may be in connection with various wireless communications networks such as a wireless wide area network ("WWAN"), a wireless local area network ("WLAN"), a wireless personal area network (WPAN), and so on. The term "network" and "system" may be used interchangeably herein. A WWAN may be a Code Division Multiple Access ("CDMA") network, a Time Division Multiple Access ("TDMA") network, a Frequency Division Multiple Access ("FDMA") network, an Orthogonal Frequency Division Multiple Access ("OFDMA") network, a Single-Carrier Frequency Division Multiple Access ("SC-FDMA") network, or any combination of the above networks, and so on. A CDMA network may implement one or more radio access technologies ("RATs") such as cdma2000, Wideband-CDMA ("W-CDMA"), to name just a few radio technologies. Here, cdma2000 may include technologies implemented according to IS-95, IS-2000, and IS-856 standards. A TDMA network may implement Global System for Mobile Communications ("GSM"), Digital Advanced Mobile Phone System ("D-AMPS"), or some other RAT. GSM and W-CDMA are described in documents from a consortium named "3rd Generation Partnership Project" ("3GPP"). 5G NR and LTE communications networks may also be implemented in accordance with claimed subject matter, in an aspect. A WLAN may comprise an IEEE 802.11x network, and a WPAN may comprise a Bluetooth® network, an IEEE 802.15x, for example. Wireless communication implementations described herein may also be used in connection with any combination of WWAN, WLAN or WPAN.

Techniques described herein may be used with an SPS that includes any one of several GNSS and/or combinations of GNSS. Furthermore, such techniques may be used with positioning systems that utilize terrestrial transmitters acting as "pseudolites", or a combination of SVs and such terrestrial transmitters. Terrestrial transmitters may, for example, include ground-based transmitters that broadcast a PN code or other ranging code (e.g., similar to a GPS or CDMA cellular signal). Such a transmitter may be assigned a unique PN code so as to permit identification by a remote receiver. Terrestrial transmitters may be useful, for example, to augment an SPS in situations where SPS signals from an orbiting SV might be unavailable, such as in tunnels, mines, buildings, urban canyons or other enclosed areas. Another implementation of pseudolites is known as radio-beacons. The term "SV", as used herein, is intended to include terrestrial transmitters acting as pseudolites, equivalents of pseudolites, and possibly others. The terms "SPS signals" and/or "SV signals", as used herein, is intended to include SPS-like signals from terrestrial transmitters, including terrestrial transmitters acting as pseudolites or equivalents of pseudolites.

In the preceding detailed description, numerous specific details have been set forth to provide a thorough understanding of claimed subject matter. However, it will be understood by those skilled in the art that claimed subject matter may be practiced without these specific details. In other instances, methods and apparatuses that would be known by one of ordinary skill have not been described in detail so as not to obscure claimed subject matter.

The terms, "and", "or", and "and/or" as used herein may include a variety of meanings that also are expected to depend at least in part upon the context in which such terms are used. Typically, "or" if used to associate a list, such as A, B or C, is intended to mean A, B, and C, here used in the inclusive sense, as well as A, B or C, here used in the exclusive sense. In addition, the term "one or more" as used herein may be used to describe any feature, structure, or characteristic in the singular or may be used to describe a plurality or some other combination of features, structures or characteristics. Though, it should be noted that this is merely an illustrative example and claimed subject matter is not limited to this example.

While there has been illustrated and described what are presently considered to be example features, it will be understood by those skilled in the art that various other modifications may be made, and equivalents may be substituted, without departing from claimed subject matter. Additionally, many modifications may be made to adapt a particular situation to the teachings of claimed subject matter without departing from the central concept described herein.

Therefore, it is intended that claimed subject matter not be limited to the particular examples disclosed, but that such claimed subject matter may also include all aspects falling within the scope of appended claims, and equivalents thereof.

For an implementation involving firmware and/or software, the methodologies may be implemented with modules (e.g., processors, memory, procedures, functions, and so on) that perform the functions described herein. Any machine-readable medium tangibly embodying instructions may be used in implementing the methodologies described herein. For example, software codes may be stored in a memory and executed by a processor unit. Memory may be implemented within the processor unit or external to the processor unit. As used herein the term "memory" refers to any type of long term, short term, volatile, nonvolatile, or other memory and is not to be limited to any particular type of memory or number of memories, or type of media upon which memory is stored.

If implemented in firmware and/or software, the functions may be stored as one or more instructions or code on a non-transitory machine-readable storage medium. Examples include computer-readable media encoded with a data structure and computer-readable media encoded with a computer program. Machine or computer-readable media includes physical computer storage media (e.g., a non-transitory machine-readable medium). A storage medium may be any available medium that can be accessed by a computer. By way of example, and not limitation, such computer-readable media can comprise RAM, ROM, EEPROM, CD-ROM or other optical disk storage, magnetic disk storage, semiconductor storage, or other storage devices, or any other medium that can be used to store desired program code in the form of instructions or data structures and that can be accessed by a computer. Combinations of the above should also be included within the scope of computer-readable media.

In addition to storage on computer-readable storage medium, instructions and/or data may be provided as signals on transmission media included in a communication apparatus. For example, a communication apparatus may include a transceiver having signals indicative of instructions and data. The instructions and data are configured to cause one or more processors to implement the functions outlined in the claims. That is, the communication apparatus includes transmission media with signals indicative of information to perform disclosed functions. At a first time, the transmission media included in the communication apparatus may include a first portion of the information to perform the disclosed functions, while at a second time the transmission media included in the communication apparatus may include a second portion of the information to perform the disclosed functions.

Implementation examples are described in the following numbered clauses:

Clause 1. A method for determining a position estimate of a mobile device, comprising: obtaining sensor information; detecting one or more identifiable features in the sensor information; determining a range to at least one of the one or more identifiable features; obtaining coarse map information; determining a location of the at least one of the one or more identifiable features based on the coarse map information; and determining the position estimate for the mobile device based at least in part on the range to the at least one of the one or more identifiable features.

Clause 2. The method of clause 1, wherein determining the range to the at least one of the one or more identifiable features is based on an output of a remote sensor.

Clause 3. The method of clause 2, wherein the remote sensor is a lidar device or a radar device.

Clause 4. The method of clause 1, wherein the at least one of the one or more identifiable features includes at least one of a crosswalk, an intersection, a traffic light, and a road sign.

Clause 5. The method of clause 1, wherein obtaining the coarse map information includes providing a coarse position to a remote server and receiving the coarse map information from the remote server.

Clause 6. The method of clause 5, wherein the coarse position is based on a location computed by a satellite position system.

Clause 7. The method of clause 5, wherein the coarse position of the mobile device is based on a terrestrial navigation technique.

Clause 8. The method of clause 1, wherein the sensor information is an image and detecting the one or more identifiable features in the sensor information includes performing an optical character recognition process on the image.

Clause 9. The method of clause 8, wherein detecting the one or more identifiable features in the sensor information includes determining a street name or a business name.

Clause 10. A method for determining a position estimate of a mobile device, comprising: obtaining coarse map information; obtaining sensor information; performing an optical character recognition process on the sensor information; determining one or more identifiable features based on the optical character recognition process and the coarse map information; and determining the position estimate for the mobile device based at least in part on the coarse map information and the one or more identifiable features.

Clause 11. The method of clause 10, further comprising: determining a distance to the one or more identifiable features; and determining the position estimate for the mobile device based at least in part on the distance to the one or more identifiable features.

Clause 12. The method of clause 11, wherein determining the distance to the one or more identifiable features is based on an output of a range sensor.

Clause 13. The method of clause 12, wherein the range sensor is a lidar device or a radar device.

Clause 14. The method of clause 10, wherein determining the one or more identifiable features includes determining a street name and an intersection location.

Clause 15. The method of clause 10, wherein determining the one or more identifiable features includes determining a business name and an address associated with the business name.

Clause 16. The method of clause 10, wherein obtaining the coarse map information includes providing a coarse position to a remote server and receiving the coarse map information from the remote server.

Clause 17. The method of clause 16, wherein the coarse position of the mobile device is based on a location obtained using a global navigation satellite system.

Clause 18. The method of clause 16, wherein the coarse position of the mobile device is based on a location obtained using a terrestrial navigation technique.

Clause 19. A method for determining a position estimate of a mobile device, comprising: determining a coarse position of the mobile device; obtaining coarse map information based on the coarse position; obtaining sensor information; determining one or more road curvature features based on the sensor information; determining that a comparison value meets a threshold, wherein the comparison value is based on a comparison between a road curvature feature in the coarse map information and the one or more road curvature features detected in the sensor information; determining a heading for the mobile device based at least in part on the road curvature feature in the coarse map information; and determining the position estimate for the mobile device based at least in part on the heading.

Clause 20. The method of clause 19, wherein the sensor information is an image.

Clause 21. The method of clause 19, wherein the sensor information is a point cloud obtained with one or more radar or lidar sensors.

Clause 22. The method of clause 19, wherein the sensor information is obtained with one or more remote sensors.

Clause 23. The method of clause 19, wherein the one or more road curvature features include one or more lane markers.

Clause 24. The method of clause 19, wherein the one or more road curvature features include one or more guardrails.

Clause 25. The method of clause 19, wherein determining that the comparison value meets a threshold value includes performing a convolution between the road curvature feature detected in the sensor information and a road in the coarse map information.

Clause 26. The method of clause 19, wherein the coarse position of the mobile device is based on a location obtained using a global navigation satellite system.

Clause 27. The method of clause 19, wherein the coarse position of the mobile device is based on a location obtained using a terrestrial navigation technique.

Clause 28. The method of clause 19, wherein obtaining the coarse map information includes providing the coarse position to a remote server and receiving the coarse map information from the remote server.

Clause 29. The method of clause 19, wherein determining the position estimate includes providing heading and global navigation satellite signal information to a recursive algorithm.

Clause 30. The method of clause 29, wherein the recursive algorithm is a Kalman filter.

Clause 31. An apparatus, comprising: a memory; at least one transceiver; at least one processor communicatively coupled to the memory and the at least one transceiver, and configured to: obtain sensor information; detect one or more identifiable features in the sensor information; determine a range to at least one of the one or more identifiable features; obtain coarse map information; determine a location of the at least one of the one or more identifiable features based on the coarse map information; and determine a position estimate based at least in part on the range to the at least one of the one or more identifiable features.

Clause 32. The apparatus of clause 31, wherein the at least one processor is further configured to determine the range to the at least one of the one or more identifiable features based on an output of a remote sensor.

Clause 33. The apparatus of clause 32, wherein the remote sensor is a lidar device or a radar device.

Clause 34. The apparatus of clause 31, wherein the at least one of the one or more identifiable features includes at least one of a crosswalk, an intersection, a traffic light, and a road sign.

Clause 35. The apparatus of clause 31, wherein the at least one processor is further configured to transmit a coarse position to a remote server and receive the coarse map information from the remote server.

Clause 36. The apparatus of clause 35, wherein the coarse position is based on a location computed by a satellite position system.

Clause 37. The apparatus of clause 35, wherein the at least one processor is further configured to determine the coarse position based on a terrestrial navigation technique.

Clause 38. The apparatus of clause 31, wherein the sensor information is an image and the at least on processor is further configured to perform an optical character recognition process on the image.

Clause 39. The apparatus of clause 38, wherein the at least one processor is further configured to determine a street name or a business name based on the optical character recognition process on the image.

Clause 40. An apparatus, comprising: a memory; at least one transceiver; at least one processor communicatively coupled to the memory and the at least one transceiver, and configured to: obtain coarse map information; obtain sensor information; perform an optical character recognition process on the sensor information; determine one or more identifiable features based on the optical character recognition process and the coarse map information; and determine a position estimate based at least in part on the coarse map information and the one or more identifiable features.

Clause 41. The apparatus of clause 40, wherein the at least one processor is further configured to: determine a distance to the one or more identifiable features; and determine the position estimate based at least in part on the distance to the one or more identifiable features.

Clause 42. The apparatus of clause 41, wherein the at least one processor is configured to determine the distance to the one or more identifiable features based on an output of a range sensor.

Clause 43. The apparatus of clause 42, wherein the range sensor is a lidar device or a radar device.

Clause 44. The apparatus of clause 40, wherein the at least one processor is further configured to determine a street name and an intersection location.

Clause 45. The apparatus of clause 40, wherein the at least one processor is further configured to determine a business name and an address associated with the business name.

Clause 46. The apparatus of clause 40, wherein the at least one processor is further configured to transmit a coarse position to a remote server and receive the coarse map information from the remote server.

Clause 47. The apparatus of clause 46, wherein the coarse position is based on a location obtained using a global navigation satellite system.

Clause 48. The apparatus of clause 46, wherein the at least one processor is further configured to determine the coarse position based on a terrestrial navigation technique.

Clause 49. An apparatus, comprising: a memory; at least one transceiver; at least one processor communicatively coupled to the memory and the at least one transceiver, and configured to: determine a coarse position; obtain coarse map information based on the coarse position; obtain sensor information; determine one or more road curvature features based on the sensor information; determine that a comparison value meets a threshold, wherein the comparison value is based on a comparison between a road curvature feature in the coarse map information and the one or more road curvature features detected in the sensor information; determine a heading based at least in part on the road curvature feature in the coarse map information; and determine a position estimate based at least in part on the heading.

Clause 50. The apparatus of clause 49, wherein the sensor information is an image.

Clause 51. The apparatus of clause 49, wherein the sensor information is a point cloud obtained with one or more radar or lidar sensors.

Clause 52. The apparatus of clause 49, wherein the at least one processor is further configured to obtain the sensor information from one or more remote sensors.

Clause 53. The apparatus of clause 49, wherein the one or more road curvature features include one or more lane markers.

Clause 54. The apparatus of clause 49, wherein the one or more road curvature features include one or more guardrails.

Clause 55. The apparatus of clause 49, wherein the at least one processor is further configured to perform a convolution between the road curvature feature detected in the sensor information and a road in the coarse map information.

Clause 56. The apparatus of clause 49, wherein the coarse position is based on a location obtained using a global navigation satellite system.

Clause 57. The apparatus of clause 49, wherein the at least on processor is further configured to determine the coarse position based on a terrestrial navigation technique.

Clause 58. The apparatus of clause 49, wherein the at least one processor is further configured to transmit the coarse position to a remote server and receive the coarse map information from the remote server.

Clause 59. The apparatus of clause 49, wherein the at least one processor is further configured to utilize heading and global navigation satellite signal information in a recursive algorithm.

Clause 60. The apparatus of clause 59, wherein the recursive algorithm is a Kalman filter.

Clause 61. An apparatus for determining a position estimate of a mobile device, comprising: means for obtaining sensor information; means for detecting one or more identifiable features in the sensor information; means for determining a range to at least one of the one or more identifiable features; means for obtaining coarse map information; means for determining a location of the at least one of the one or more identifiable features based on the coarse map information; and means for determining the position estimate for the mobile device based at least in part on the range to the at least one of the one or more identifiable features.

Clause 62. An apparatus for determining a position estimate of a mobile device, comprising: means for obtaining coarse map information; means for obtaining sensor information; means for performing an optical character recognition process on the sensor information; means for determining one or more identifiable features based on the optical character recognition process and the coarse map information; and means for determining the position estimate for the mobile device based at least in part on the coarse map information and the one or more identifiable features.

Clause 63. An apparatus for determining a position estimate of a mobile device, comprising: means for determining a coarse position of the mobile device; means for obtaining coarse map information based on the coarse position; means for obtaining sensor information; means for determining one or more road curvature features based on the sensor information; means for determining that a comparison value meets a threshold, wherein the comparison value is based on a comparison between a road curvature feature in the coarse map information and the one or more road curvature features detected in the sensor information; means for determining a heading for the mobile device based at least in part on the road curvature feature in the coarse map information; and means for determining the position estimate for the mobile device based at least in part on the heading.

Clause 64. A non-transitory processor-readable storage medium comprising processor-readable instructions configured to cause one or more processors to determine a position estimate of a mobile device, comprising: code for obtaining sensor information; code for detecting one or more identifiable features in the sensor information; code for determining a range to at least one of the one or more identifiable features; code for obtaining coarse map information; code for determining a location of the at least one of the one or more identifiable features based on the coarse map information; and code for determining the position estimate for the mobile device based at least in part on the range to the at least one of the one or more identifiable features.

Clause 65. A non-transitory processor-readable storage medium comprising processor-readable instructions configured to cause one or more processors to determine a position estimate of a mobile device, comprising: code for obtaining coarse map information; code for obtaining sensor information; code for performing an optical character recognition process on the sensor information; code for determining one or more identifiable features based on the optical character recognition process and the coarse map information; and code for determining the position estimate for the mobile device based at least in part on the coarse map information and the one or more identifiable features.

Clause 66. A non-transitory processor-readable storage medium comprising processor-readable instructions configured to cause one or more processors to determine a position estimate of a mobile device, comprising: code for determining a coarse position of the mobile device; code for obtaining coarse map information based on the coarse position; code for obtaining sensor information; code for determining one or more road curvature features based on the sensor information; code for determining that a comparison value meets a threshold, wherein the comparison value is based on a comparison between a road curvature feature in the coarse map information and the one or more road curvature features detected in the sensor information; code for determining a heading for the mobile device based at least in part on the road curvature feature in the coarse map information; and code for determining the position estimate for the mobile device based at least in part on the heading.

What is claimed is:

1. A method for determining a position estimate of a mobile device, comprising:
   obtaining a coarse position information;
   obtaining map information based at least in part on the coarse position information;
   obtaining sensor information;
   detecting one or more identifiable features in the sensor information;
   determining an orientation of the mobile device based at least in part on the sensor information and the one or more identifiable features; and
   determining the position estimate for the mobile device based at least in part on the coarse position information and the orientation of the mobile device.

2. The method of claim 1 wherein the coarse position information is based at least in part on signals received from one or more satellites in a satellite navigation system.

3. The method of claim 1 wherein the coarse position information is based at least in part on signals received from a cellular communication system.

4. The method of claim 1 wherein the coarse position information is based at least in part on signals received from one or more inertial measurement devices.

5. The method of claim 1 further comprising:
   determining a range to at least one of the one or more identifiable features; and
   determining a location of the at least one the one or more identifiable features, wherein the position estimate is based at least in part on the range to the at least one of the one or more identifiable features.

6. The method of claim 5 wherein determining the range to the at least one of the one or more identifiable features is based on an output of a remote sensor.

7. The method of claim 6 wherein the remote sensor is a lidar device or a radar device.

8. The method of claim 6 wherein the remote sensor is an optical sensor.

9. The method of claim 1 wherein the sensor information is an image and detecting the one or more identifiable features in the sensor information includes performing an optical character recognition process on the image.

10. An apparatus, comprising:
    at least one memory;
    at least one transceiver;
    at least one processor communicatively coupled to the at least one memory and the at least one transceiver, and configured to:

obtain a coarse position information;
obtain map information based at least in part on the coarse position information;
obtain sensor information;
detect one or more identifiable features in the sensor information;
determine an orientation based at least in part on the sensor information and the one or more identifiable features; and
determine a position estimate based at least in part on the coarse position information and the orientation.

11. The apparatus of claim 10 further comprising a global navigation satellite system (GNSS) receiver, wherein the at least one processor is further configured to obtain the coarse position information based at least in part on signals received by the GNSS receiver.

12. The apparatus of claim 10 wherein the at least one processor is further configured to obtain the coarse position information based at least in part on signals transmitted by one or more stations in a cellular communication system.

13. The apparatus of claim 10 wherein the at least one processor is further configured to obtain the coarse position information based at least in part on one or more inertial measurement devices.

14. The apparatus of claim 10 wherein the at least one processor is further configured to:
determine a range to at least one of the one or more identifiable features;
determine a location of the at least one the one or more identifiable features; and
determine the position estimate based at least in part on the range to the at least one of the one or more identifiable features.

15. The apparatus of claim 14 wherein the at least one processor is further configured to determine the range to the at least one of the one or more identifiable features based on an output of a remote sensor.

16. The apparatus of claim 10 further comprising at least one lidar device or at least one radar device, wherein the at least one processor is communicatively coupled to the at least one lidar device or the at least one radar device.

17. The apparatus of claim 10 further comprising at least one optical sensor, wherein the at least one processor is communicatively coupled to the at least one optical sensor.

18. The apparatus of claim 17 wherein the at least one processor is further configured to obtain an image with the at least one optical sensor and perform an optical character recognition process on the image to detect the one or more identifiable features in the sensor information.

19. An apparatus for determining a position estimate of a mobile device, comprising:
means for obtaining a coarse position information;
means for obtaining map information based at least in part on the coarse position information;
means for obtaining sensor information;
means for detecting one or more identifiable features in the sensor information;
means for determining an orientation of the mobile device based at least in part on the sensor information and the one or more identifiable features; and
means for determining the position estimate for the mobile device based at least in part on the coarse position information and the orientation of the mobile device.

20. The apparatus of claim 19 further comprising means for receiving signals from one or more satellite vehicles, wherein the coarse position information is based at least in part on signals received from the one or more satellites vehicles.

21. The apparatus of claim 19 further comprising means for receiving signals from a cellular communication system, wherein the coarse position information is based at least in part on signals received from the cellular communication system.

22. The apparatus of claim 19 further comprising means for obtaining inertial measurements, wherein the coarse position information is based at least in part on measurements obtained by the means for obtaining inertial measurements.

23. The apparatus of claim 19 further comprising:
means for determining a range to at least one of the one or more identifiable features; and
means for determining a location of the at least one the one or more identifiable features, wherein the position estimate is based at least in part on the range to the at least one of the one or more identifiable features.

24. The apparatus of claim 19 further comprising means for obtaining an image and means for performing an optical character recognition process on the image.

25. A non-transitory processor-readable storage medium comprising processor-readable instructions configured to cause one or more processors to determine a position estimate of a mobile device, comprising:
code for obtaining a coarse position information;
code for obtaining map information based at least in part on the coarse position information;
code for obtaining sensor information;
code for detecting one or more identifiable features in the sensor information;
code for determining an orientation of the mobile device based at least in part on the sensor information and the one or more identifiable features; and
code for determining the position estimate for the mobile device based at least in part on the coarse position information and the orientation of the mobile device.

26. The non-transitory processor-readable storage medium of claim 25 further comprising code obtaining the coarse position information based at least in part on signals received by a global navigation satellite system (GNSS) receiver.

27. The non-transitory processor-readable storage medium of claim 25 further comprising code obtaining the coarse position information based at least in part on signals received from a cellular communication system.

28. The non-transitory processor-readable storage medium of claim 25 further comprising code for obtaining the coarse position information based at least in part on measurements obtained by one or more inertial measurement devices.

29. The non-transitory processor-readable storage medium of claim 25 further comprising:
code for determining a range to at least one of the one or more identifiable features;
code for determining a location of the at least one the one or more identifiable features; and
code for determining the position estimate based at least in part on the range to the at least one of the one or more identifiable features.

30. The non-transitory processor-readable storage medium of claim 25 further comprising code for obtaining an image and code for performing an optical character recognition process on the image.

* * * * *